US006711480B2

(12) United States Patent
Yamamoto et al.

(10) Patent No.: US 6,711,480 B2
(45) Date of Patent: Mar. 23, 2004

(54) SYSTEM, METHOD AND PROGRAM FOR SUPPORTING DRIVING OF CARS

(75) Inventors: Tadashi Yamamoto, Hiroshima (JP); Satoru Tamura, Higashi-Hiroshima (JP)

(73) Assignee: Sanei Co., Ltd., Hiroshima (JP)

( * ) Notice: Subject to any disclaimer, the term of this patent is extended or adjusted under 35 U.S.C. 154(b) by 0 days.

(21) Appl. No.: 10/247,368

(22) Filed: Sep. 20, 2002

(65) Prior Publication Data

US 2003/0065429 A1 Apr. 3, 2003

(30) Foreign Application Priority Data

Sep. 21, 2001 (JP) ....................................... 2001-288239
Mar. 14, 2002 (JP) ....................................... 2002-069645

(51) Int. Cl.[7] ................................................. B60T 1/00
(52) U.S. Cl. ......................................... 701/23; 180/168
(58) Field of Search .............................. 701/23, 24, 25, 701/300; 180/168; 340/902, 903, 905

(56) References Cited

U.S. PATENT DOCUMENTS 6,169,940 B1 1/2001 Jitsukata et al. .............. 701/23
6,577,937 B1 * 6/2003 Shuman et al. ............... 701/48
2001/0023380 A1 9/2001 Mizutani ..................... 701/23
2002/0198632 A1 * 12/2002 Breed et al. .................. 701/1

FOREIGN PATENT DOCUMENTS

JP 10-261193 9/1998
JP 11-212640 8/1999
WO 01/13069 2/2001

* cited by examiner

*Primary Examiner*—Marthe Y. Marc-Coleman
(74) *Attorney, Agent, or Firm*—Wenderoth, Lind & Ponack, L.L.P.

(57) ABSTRACT

A system for supporting to drive cars has a server 10 for processing road geometry, an apparatus 20 for supporting to drive a car 70, and a computer network 40 for communicating with the server 10 and the apparatus 20, wherein the saver 10 provides road parameters and/or road information for the apparatus 20, and the apparatus 20, placed on the car 70, supports to drive the car 70 and/or automatically drives the car 70 by using the road information which includes virtual digital driving orbit (lattice of coordinate) 60 from the saver 10 and/or calculated by the road parameters, and GPS (Global Positioning System) information from GPS satellite 50 for calculating the position of the car 70.

32 Claims, 30 Drawing Sheets

*FIG.1 - PRIOR ART*

FIG.2 - PRIOR ART

FIG.9

| | | |
|---|---|---|
| MEASURING POINT OF LINEAR STARTING BP-POINT | | = 25460. 0m or No254 + 60. 0 |
| COORDINATE OF LINEAR STARTING BP-POINT | X<br>Y | ≒ 215, 533. 123m<br>= 513, 846. 753 m |
| AZIMUTH OF LINEAR STARTING BP-POINT (ANGLE FROM NORTH) | | = 185° 14′ 53. 10″ |
| CLOTHOID PARAMATOR | A1 | = 400. 0m |
| 〃 | A2 | = 400. 0m |
| 〃 | A3 | = 500. 0m |
| 〃 | A4 | = 500. 0m |
| RADIUS OF CIRCULAR ARCS | R1 | = 800. 0m (CURVE OF COUNTER-CLOCKWISE) |
| 〃 | R2 | = −1000. 0m (CURVE OF CLOCKWISE) |
| LENGTH OF CIRCULAR ARCS | C1 | = 251. 3m |
| 〃 | C2 | = 325. 5m |
| LENGTH OF STRAIGHT LINE | S1 | = 425. 0m |

FIG.10

| | |
|---|---|
| WIDTH OF ROAD CENTRAL SEPARATIVE BELT | B = 2. 0m |
| WIDTH OF LEFT ROAD | WL = 3. 5m |
| WIDTH OF RIGHT ROAD | WR = 3. 5m |
| NUMBER OF CENTER LINE(S) | N = 1 |
| HILL CLIMBING LINE | YES(or NO) |
| LEFT EXTENSION WIDTH | EWL = 0. 0m |
| RIGHT EXTENSION WIDTH | EWR = 0. 0m |

*FIG.11*

| NAME OF CONVERSION POINT | MEASURING POINT(m) | ELEVATION (m) | VCL(m) |
|---|---|---|---|
| P1 | 25400. 0 | 151. 853 | |
| P2 | 25800. 0 | 145. 366 | 400. 0 |
| P3 | 26300. 0 | 163. 211 | 450. 0 |
| P4 | 26800. 0 | 140. 385 | |

*FIG.12A* LEFT ROAD

| NAME | MEASURING POINT(m) | GRADIENT (m) | VCL(m) |
|---|---|---|---|
| | 25460. 0 | −2. 0 | |
| | 25560. 0 | −2. 0 | |
| KE1 | 25660. 0 | −6. 0 | 100. 0 |
| KE2 | 25911. 3 | −6. 0 | 100. 0 |
| | 26011. 3 | −2. 0 | |
| | 26111. 3 | −2. 0 | |

*FIG.12B* RIGHT ROAD

| NAME | MEASURING POINT(m) | GRADIENT (m) | VCL(m) |
|---|---|---|---|
| | 25460. 0 | −2. 0 | |
| KE1 | 25660. 0 | 6. 0 | 100. 0 |
| KE2 | 25911. 3 | 6. 0 | 100. 0 |
| | 26111. 3 | −6. 0 | |

TRIDIMENTIONAL SINGLE POINT

TRIDIMENTIONAL TRIANGLE PATCH

TRIDIMENTIONAL BEZIER OR NURBS SURFACE $$Z = \frac{\Delta i\ (\%)}{200 \times VCL} \times X^2$$

| CAR DATA | | ROAD INFORMATION |
|---|---|---|
| $\psi$ (YAWING) | ← | $\alpha$ (DISPLACEMENT ANGLE) |
| $\theta$s (PITCHING) | ← | SECTIONAL GRADIENT : SLOPE GRADIENT |
| $\phi$s (ROLLING) | ← | CROSSING GRADIENT OF ROAD SURFACE : CANT |

SYSTEM, METHOD AND PROGRAM FOR SUPPORTING DRIVING OF CARS

FIELD OF THE INVENTION

This invention relates to a system, a method and program products for supporting to drive cars, and more particularly to, a system, a method and program products for supporting to drive cars which automatically and safety can drive the cars.

BACKGROUND OF THE INVENTION

Systems for supporting to drive cars such as a lane marks system and a sensor system are used in the field of a car driving support nowadays. For example, the systems disclosed in TOKKAIHEI 11-212640 and TOKKAIHEI 10-261193.

In the conventional system for supporting to drive cars, however, there is a disadvantage in that the system for supporting to dive cars with which the performance of the system is low, because the system has to execute a lot of information from the sensor and the lane marks.

And more, in the system, it costs highly for constructing the infrastructure of the roads.

SUMMARY OF THE INVENTION

Accordingly, it is an object of the invention to provide a system, a method and program products for supporting to drive cars which automatically and safety can drive the cars without the high costs and with high performance.

A system for supporting to drive cars according to the resent invention, which comprises a server for processing road geometry, an apparatus for supporting to drive a car, and a computer network for communicating with the server for processing road geometry and the apparatus for supporting to drive a car, wherein the server for processing the road geometry includes communication control means for controlling communication with the computer network, storing means of road geometry for storing road parameters and/or road information, and processing means of road parameters for loading the road parameters and the road information stored in the storing means in dependence upon a request from the apparatus for supporting to drive the car received via the communication control means, the apparatus for supporting to drive the car includes communication control means for controlling communication with the computer network, positioning information control means for calculating position information of the car by using base position information, means for generating driving support information by using the road parameters and/or the road information from the server for processing the road geometry and the positioning information of the car from the positioning information control means.

A method for supporting to drive cars according to the present invention, which executes driving support processes by using a server for processing road geometry, an apparatus for supporting to drive a car, and a computer network for communicating with the server for processing road geometry and the apparatus for supporting to drive a car, comprises the steps of (A) in the apparatus for supporting to drive a car, sending request information inputted for supporting to drive the car to the server for processing road geometry via the computer network, (B) in the server for processing road geometry, loading road parameters and/or beforehand stored road information in dependence upon the request information receiving from the apparatus for supporting to drive a car, and sending the road parameters and/or the road information to the apparatus for supporting to drive a car via the computer network, (C) in the apparatus for supporting to drive a car, generating road information by using the road parameters when receiving the road parameters from the server for processing road geometry, (D) in the apparatus for supporting to drive a car, calculating position information of the car by using base position information, (E) in the apparatus for supporting to drive a car, generating driving support information by using the road information received from the server for processing road geometry and/or generated by the step of (C), and the positioning information of the car calculated by the step of (D).

Program products for supporting to drive cars according to the present invention, which is executed by computer system, comprises the steps of (A) sending request information inputted for supporting to drive the car to the server for processing road geometry via the computer network, (B) loading road parameters and/or beforehand stored road information in dependence upon the request information receiving from the apparatus for supporting to drive a car, and sending the road parameters and/or the road information to the apparatus for supporting to drive a car via the computer network, (C) generating road information by using the road parameters when receiving the road parameters from the server for processing road geometry, (D) calculating position information of the car by using base position information, (E) generating driving support information by using the road information received from the server for processing road geometry and/or generated by the step of (C), and the positioning information of the car calculated by the step of (D).

BRIEF DESCRIPTION OF THE DRAWINGS

The invention will be described in more detail in conjunction with the appended drawings, wherein:

FIG. 9 is a diagram showing an example of the road parameters loaded from the data base of the road geometry;

FIG. 10 is a diagram showing an example of the road parameters loaded from the data base of the road geometry;

FIG. 11 is a diagram showing an example of the road parameters loaded from the data base of the road geometry;

FIG. 12A is a diagram showing an example of the road parameters loaded from the data base of the road geometry;

FIG. 12B is a diagram showing an example of the road parameters loaded from the data base of the road geometry;

DETAILED DESCRIPTION OF THE PREFERRED EMBODIMENTS

Before explaining a system, a method and program products for supporting to drive cars in the preferred embodiment according to the invention, the aforementioned conventional system and method for supporting to drive cars will be explained in FIGS. 1 and 2.

Figure 1:
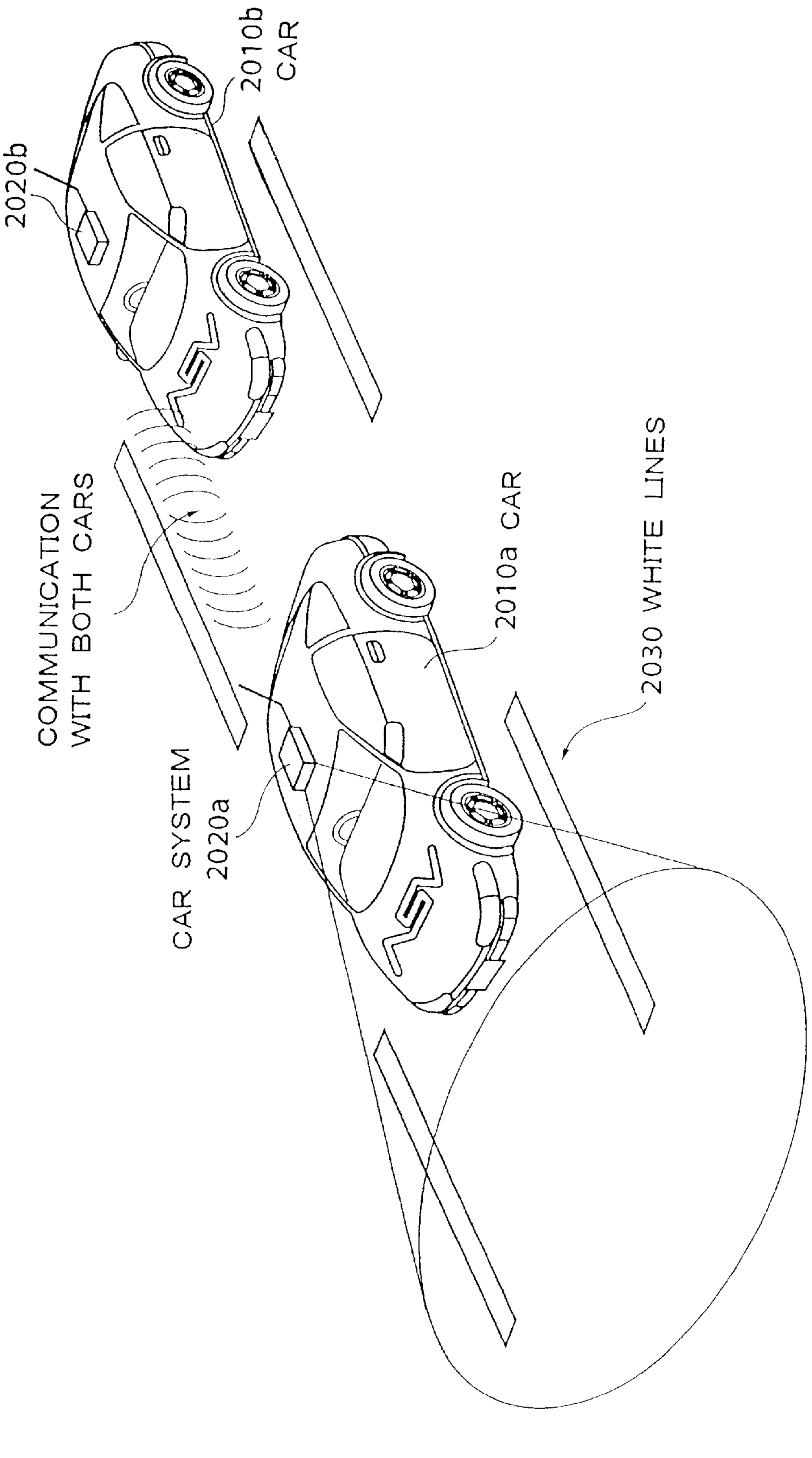
FIG. 1 is a diagram showing an example of the conventional system for supporting to drive a car.

FIG. 1 is a diagram showing an example of the conventional system for supporting to drive a car. In FIG. 1, a car system 2020*a* is placed on a car 2010*a*, and a car system 2020*b* is placed on a car 2010*b*. The car systems 2020*a* and 2020*b* estimate a best driving route by getting a traffic condition on a driving road from GPS (Global Positioning System). And the cars 2010*a* and 2010*b* are automatically driven by the car systems 2020*a* and 2020*b* which use a position information of the white lines 2030 on the road, the information by communicating with the both cars 2010*a* and 2010*b* obtained by CCD (Charge Coupled Device) cameras, and the navigation information from the GPS.

Figure 2:
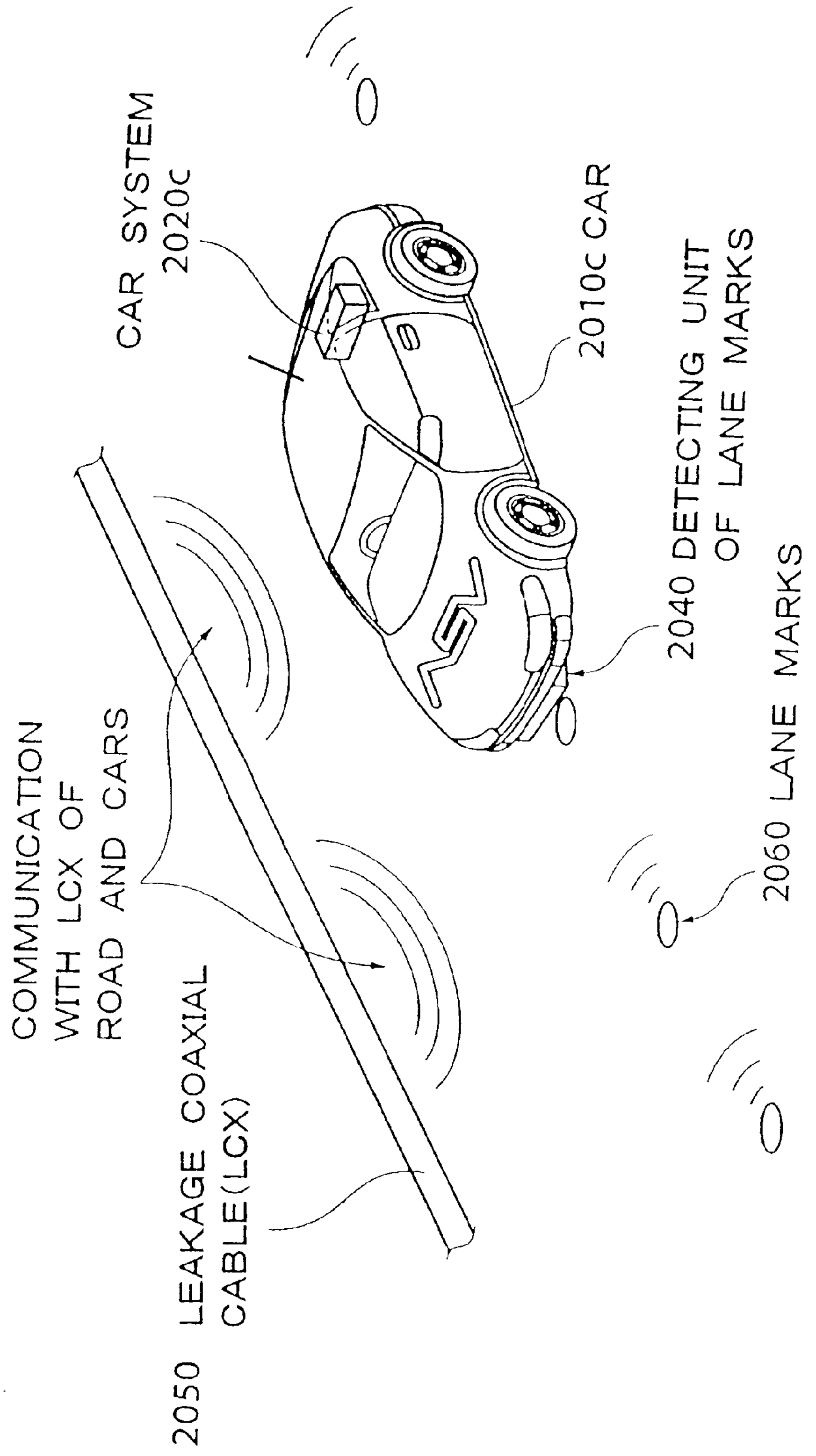
FIG. 2 is a diagram showing an example of the conventional system for supporting to drive cars.

FIG. 2 is a diagram showing an example of the conventional system for supporting to drive cars. In FIG. 2, a car system 2020*c* is placed on a car 2010*c*. The car system 2020*c* estimate a best driving route by getting a traffic condition on a driving road from GPS and/or LCX (Leakage Coaxial cable). And the car 2010*c* is automatically driven by the car system 2020*c* which uses the information of lane marks 2060 detected by a detecting unit 2040 of the lane marks and/or the information by communicating with the LCX 2050 and the car 2010*c*.

In the conventional system for supporting to drive the car disclosed in FIG. 1, however, there is a disadvantage in that it costs highly and its performance is very poor, because the car system has to process all information.

In the conventional system for supporting to drive the car disclosed in FIG. 2, however, there is a disadvantage in that it costs highly, because setting and maintenance costs of the lane marks are very high.

And there is a disadvantage in that the car is not able to be automatically driven when the lane marks are not able to be obtained.

Referring to accompanying drawings, embodiments of a system, a method and program products for supporting to drive cars according to the present invention will be explained as follows.

Figure 3:
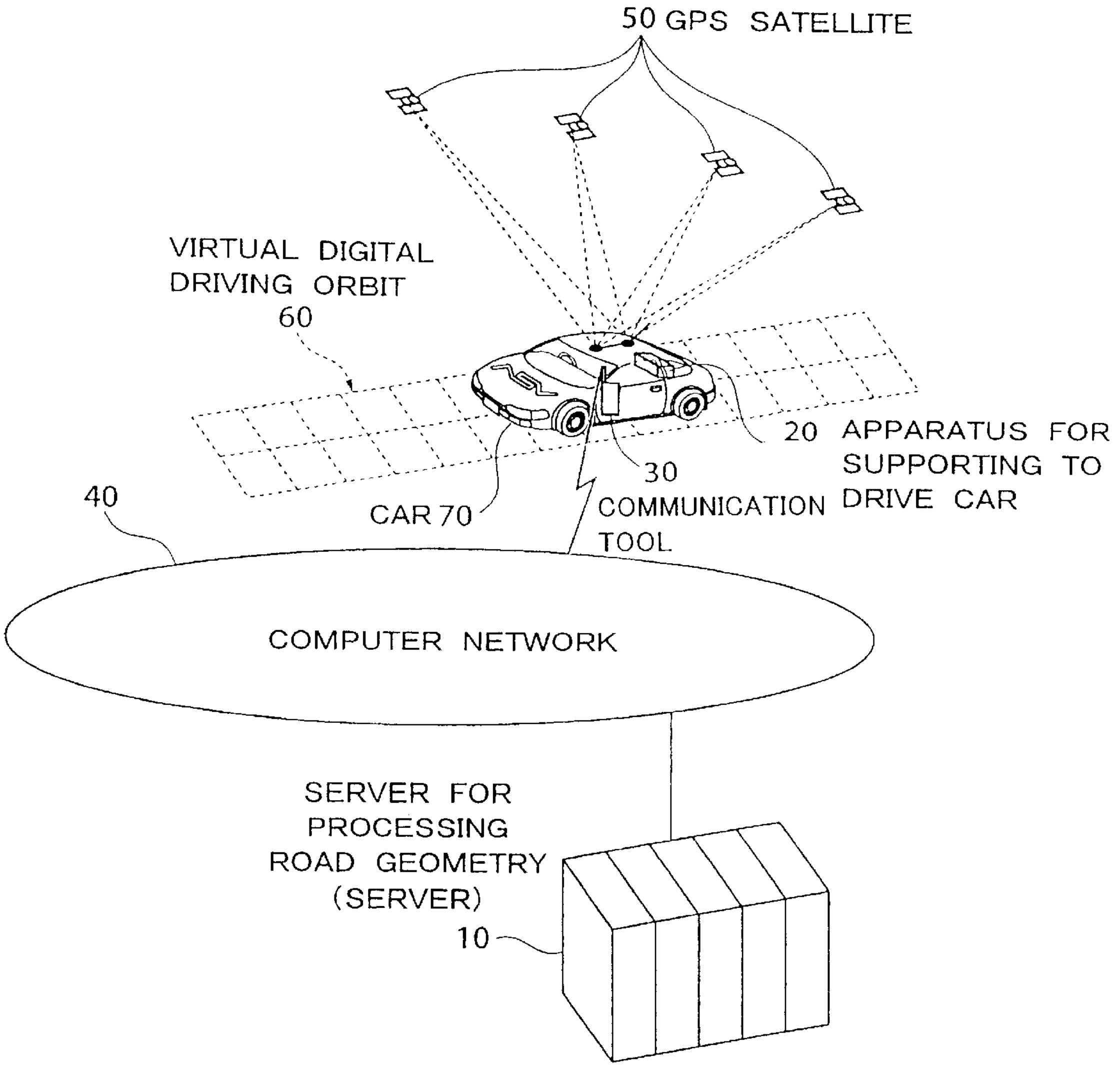
FIG. 3 is a diagram showing an example of the system for supporting to drive cars according to the present invention.

FIG. 3 is a diagram showing an example of the system for supporting to drive cars according to the present invention. In FIG. 3, a system for supporting to drive cars has a server 10 for processing road geometry, an apparatus 20 for supporting to drive a car 70, and a computer network 40 for communicating with the server 10 and the apparatus 20, wherein the saver 10 provides road parameters and/or road information for the apparatus 20, and the apparatus 20, placed on the car 70, supports to drive the car 70 and/or automatically drives the car 70 by using the road information which includes virtual digital driving orbit (lattice of coordinate) 60 from the saver 10 and/or calculated by the road parameters, and GPS (Global Positioning System) information from GPS satellite 50 for calculating the position of the car 70.

In the system for supporting to drive cars, the communication with the apparatus 20 for supporting to drive the car 70 and the computer network 40 is executed by using communication tool 30 such as a mobile phone. And the computer network 40 is constructed by an internet or an intranet.

Figure 4:
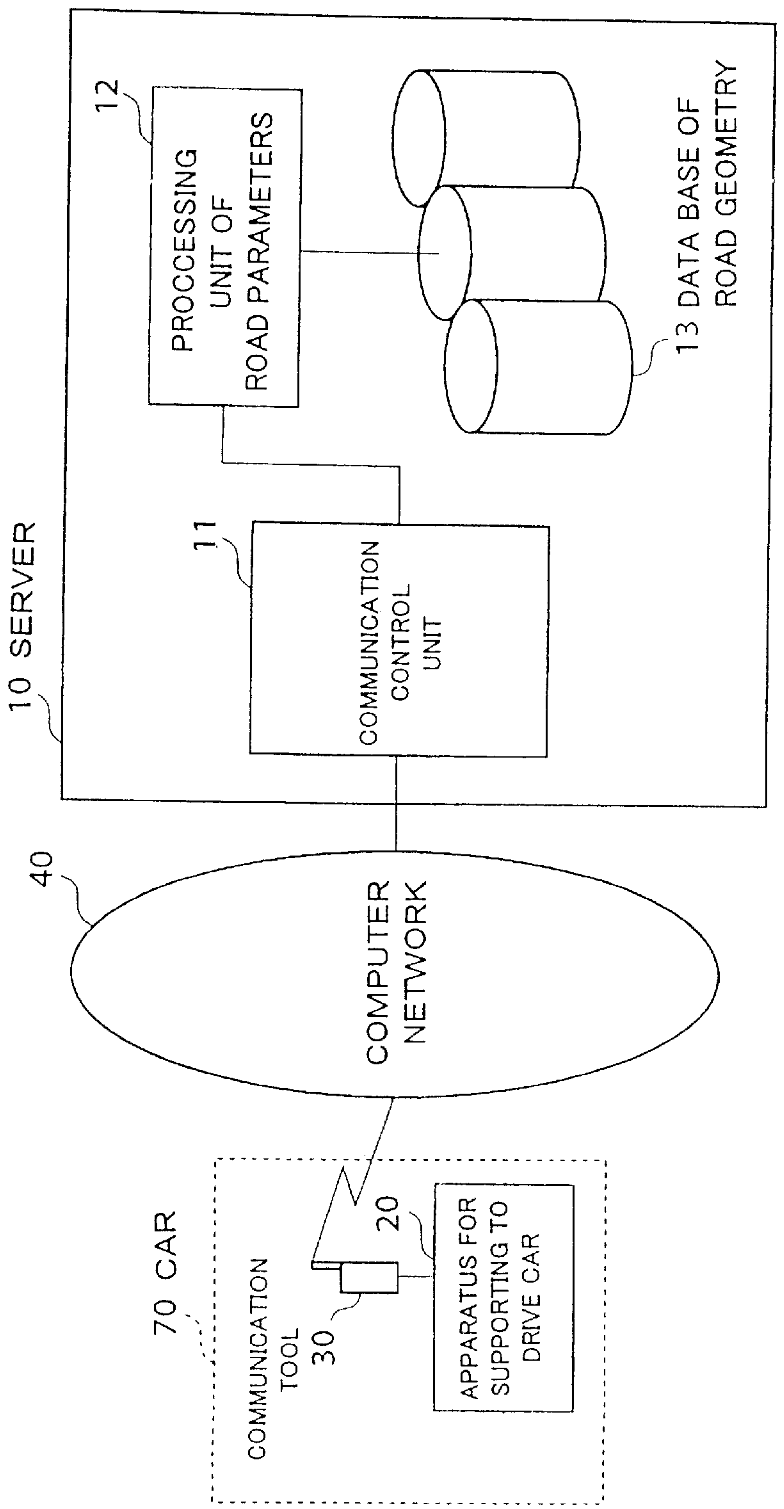
FIG. 4 is a diagram showing an example of the server for processing road geometry in the system for supporting to drive cars according to the present invention.

FIG. 4 is a diagram showing an example of the server for processing road geometry in the system for supporting to drive cars according to the present invention. In FIG. 4, the server 10 for processing the road geometry includes a communication control unit 11 for controlling communication with the computer network 40, a data base 13 of the road geometry for storing the road parameters and/or the road information, and a processing unit 12 of the road parameters for loading the road parameters and the road information stored in the data base 13 in dependence upon a request received from the apparatus 20 for supporting to drive the car 70 via the communication control unit 11.

Figure 5:
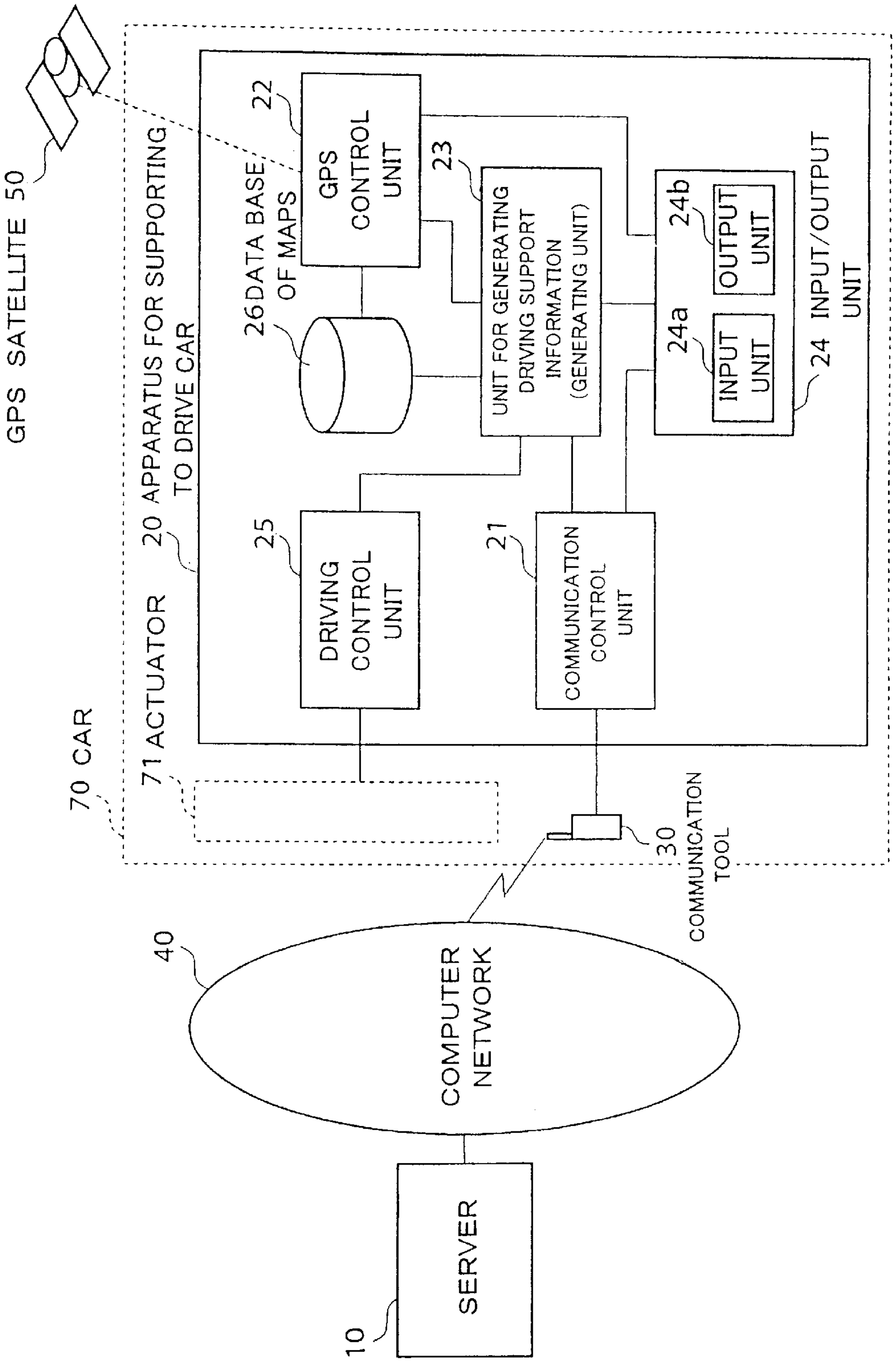
FIG. 5 is a diagram showing an example of the apparatus for supporting to drive a car in the system for supporting to drive cars according to the present invention.

FIG. 5 is a diagram showing an example of the apparatus for supporting to drive a car in the system for supporting to drive cars according to the present invention. In FIG. 5, the apparatus 20 for supporting to drive the car 70 includes a communication control unit 21 for controlling communication with the computer network 40, a GPS control unit (positioning information control unit) 22 for calculating position information of the car 70 by using base position information (GPS information) from the GPS sattellite 50, a data base 26 of maps for storing a part or all of the road information and/or map information, an unit 23 for generating driving support information by using the road parameters, the road information from the server 10 for processing the road geometry, the positioning information of the car 70 from the GPS control unit (the positioning information control unit), and/or the map information of the data base 26, an input/output unit 24 having an input unit 24*a* for inputting the request and an output unit 24*b* for displaying the road information and/or the driving support information, and a driving control unit 25 for controlling to drive the car 70 by controlling an actuator 71 by using the driving support information generated by the unit 23 for generating the driving support information.

Figure 6:
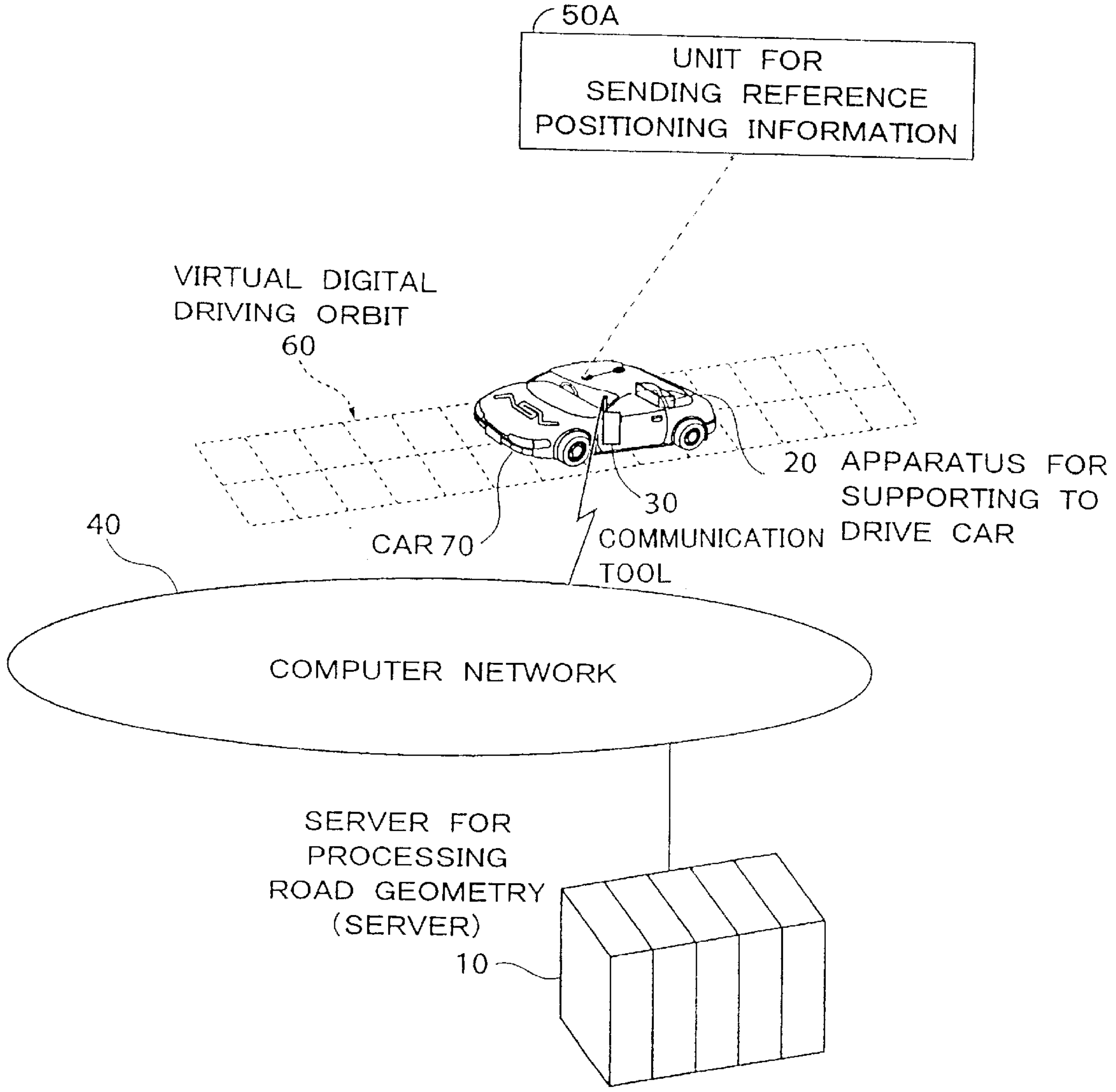
FIG. 6 is a diagram showing an example of the system for supporting to drive cars according to the present invention.

FIG. 6 is a diagram showing an example of the system for supporting to drive cars according to the present invention. In FIG. 6, the system for supporting to drive cars has a server 10 for processing road geometry, an apparatus 20A for supporting to drive a car 70, and a computer network 40 for communicating with the server 10 and the apparatus 20, wherein the saver 10 provides road parameters and/or road information for the apparatus 20A, and the apparatus 20A, placed on the car 70, supports to drive the car 70 and/or automatically drives the car 70 by using the road information which includes virtual digital driving orbit (lattice of coordinate) 60 from the saver 10 and/or calculated by the road parameters, and base position information, from an unit 50A (such as the GPS, magnetic nail, and beacon) for sending reference positioning information, for calculating the position of the car 70.

In this case, the base position information is obtained from the GPS, the magnetic nail, and/or the beacon.

In the system for supporting to drive cars, the communication with the apparatus 20 for supporting to drive the car 70 and the computer network 40 is executed by using communication tool 30 such as a mobile phone. And the computer network 40 is constructed by an internet or an intranet.

Figure 7:
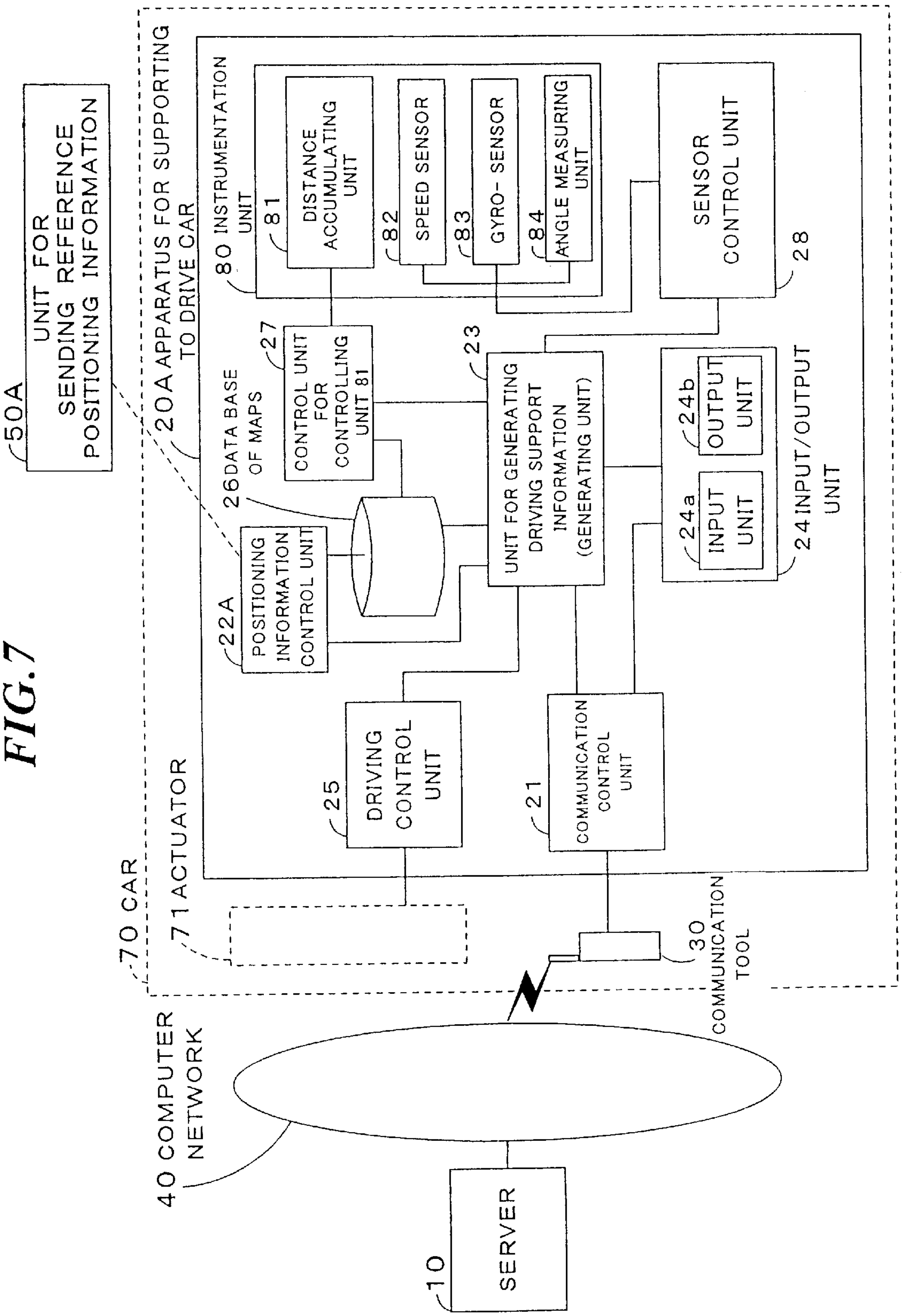
FIG. 7 is a diagram showing an example of the apparatus for supporting to drive a car in the system for supporting to drive cars according to the present invention.

FIG. 7 is a diagram showing an example of the apparatus for supporting to drive a car in the system for supporting to drive cars according to the present invention. In FIG. 7, the apparatus 20A for supporting to drive the car 70 includes a communication control unit 21 for controlling communication with the computer network 40 via communication tool 30, a positioning information control unit 22A for calculating position information of the car 70 by using the base position information from the unit 50A, a data base 26 of maps for storing a part or all of the road information and/or map information, an instrumentation unit 80 for calculating an instrumentation value by detecting a car condition, instrumentation information control units (comprising a control unit 27 for controlling a distance accumulating unit 81, and a sensor control unit 28) for generating instrumentation information based on the instrumentation value received from the instrumentation unit 80, an unit 23 for generating driving support information based on the road information generated based on the road parameters and/or received from the server 10 for processing the road geometry, the positioning information received from the positioning information control unit 22A, the instrumentation information received from the instrumentation information control units 27 and 28, and/or the map information of the data base 26, an input/output unit 24 having an input unit 24*a* for inputting the request and an output unit 24*b* for displaying the road information and/or the driving support information, and a driving control unit 25 for controlling to drive the car 70 by controlling an actuator 71 by using the driving support information generated by the unit 23 for generating the driving support information.

In the system for supporting to drive cars, the instrumentation unit 80 has a distance accumulating unit 81 for calculating an instrumentation value by accumulating driving distance of the car 70, a speed sensor 82 for calculating an instrumentation value by measuring speed of the car 70, a gyro-sensor 83 for calculating an instrumentation value by measuring gradient of the car 70, and an angle measuring unit 84 for calculating an instrumentation value by measuring an angle of car progress way.

The control unit 27 for controlling the distance accumulating unit 81 generates accumulating distance information based on the instrumentation value from the distance accumulating unit 81. The sensor unit 28 generates the speed information based on the instrumentation value from the speed sensor 82, the rolling angle information based on the instrumentation value from the gyro-sensor 83, and the way angle information based on the instrumentation value from the angle measuring unit 84.

In the system for supporting to drive cars, the road information includes the virtual digital driving orbit 60 for indicating driving orbit of the car 70.

And the unit 23 for generating the driving support information generates the virtual digital driving orbit 60 by line segment, circular arcs and/or clothoid curve, and generates a clothoid curve from a clothoid origin without executing exceptional processing near said clothoid origin in case of generating a curvature transition curve of the virtual digital driving orbit 60 using the clothoid curve, by calculating coordinates of the clothoid curve using the following recurrence equation (1), of which parameters are only the arc length "λ" from the clothoid origin, expressed as $$x = \sum_{n=0}^{\infty} (-1)^n \frac{\lambda^{4n+1}}{(4n+1)\cdot 2^{2n}\cdot(2n)!} \qquad \text{(Equation 1)}$$

$$y = \sum_{n=0}^{\infty} (-1)^n \frac{\lambda^{4n+3}}{(4n+3)\cdot 2^{2n+1}\cdot(2n+1)!}$$

where "λ" is the unit clothoid arc length, "x" and "y" is a coordinate of the arc length "λ" from a clothoid origin of the unit clothoid curve, and "n" is order.

And the unit 23 for generating the driving support information generates the clothoid curve using the following relation equation (2) of a "n" term (Tx(n), Ty(n)), which is deduced by expanding "x" and "y" of the recurrence equation (1) in a series, expressed as $$Tx(n+1) = -\frac{(4n+1)\cdot\lambda^4}{4\cdot(4n+5)\cdot(2n+2)\cdot(2n+1)}Tx(n) \qquad \text{(Equation 2)}$$

$$(n = 0, 1, 2, \Lambda)$$

$$Tx(0) = \lambda$$

-continued $$Ty(n+1) = -\frac{(4n+3)\cdot\lambda^4}{4\cdot(4n+7)\cdot(2n+3)\cdot(2n+2)}Ty(n)$$

$$(n = 0, 1, 2, \Lambda)$$

$$Ty(0) = \frac{\lambda^3}{3\cdot 2}$$

Figure 8:
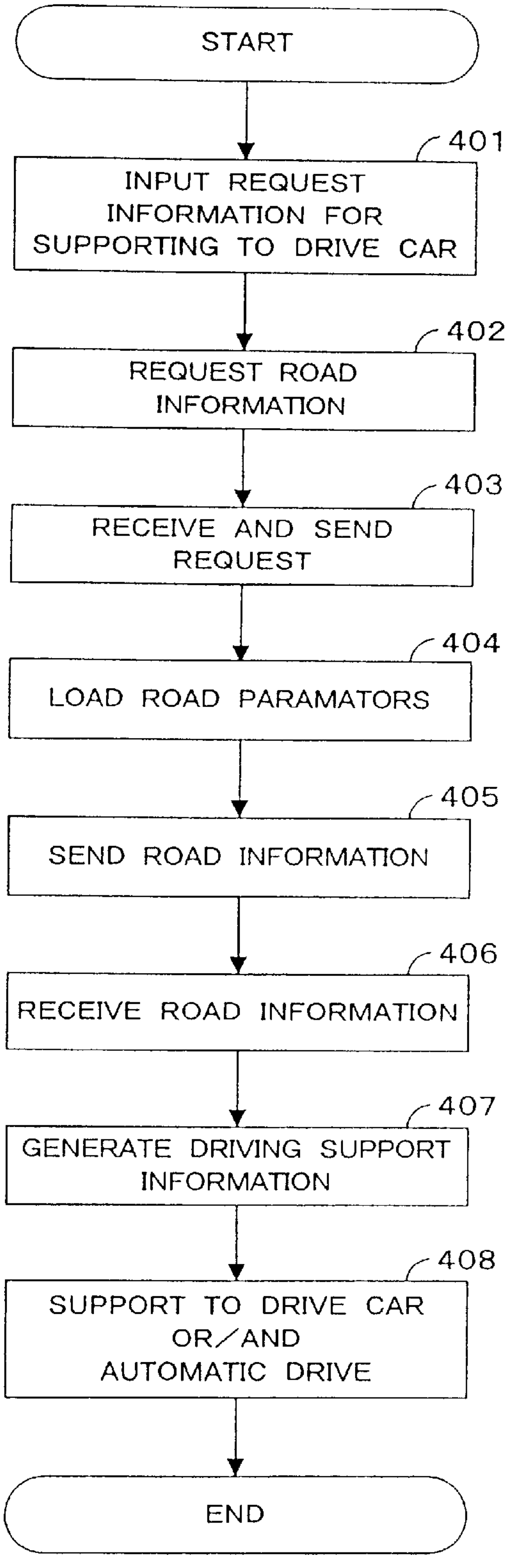
FIG. 8 is a flowchart showing an example of the method of supporting to drive cars according to the present invention.

FIG. 8 is a flowchart showing an example of the method of supporting to drive cars according to the present invention. In FIG. 8, the method for supporting to drive cars, which executes driving support processes by using the server 10 for processing the road geometry, the apparatus 20, 20A for supporting to drive the car 70, and the computer network 40 for communicating with the server 10 for processing the road geometry and the apparatus 20, 20A for supporting to drive the car 70 processes the steps as follows.

In the apparatus 20, 20A for supporting to drive the car 70, request information is inputted for supporting to drive the car 70 (at the step 401).

The request information is sent to the server 10 from the apparatus 20, 20A via said computer network 40 (at the step 402).

In the server 10, the request information is received by the communication control unit 11 and sent to the processing unit 12 (at the step 403).

In the server 10, the road parameters and/or the beforehand stored road information are loaded from the data base 13 in dependence upon the request information receiving from the apparatus 20, 20A (at the step 404).

Next, the road parameters and/or the road information are sent to the apparatus 20, 20A via the computer network 40 (at the step 405).

In the apparatus 20, 20A for supporting to drive the car 70, the road parameters and/or the road information are received, wherein the road information is generated by using the road parameters when receiving the road parameters from the server 10 (at the step 406).

In the apparatus 20, 20A for supporting to drive the car 70, the position information of the car 70 is calculated by using the base position information. Next, the driving support information is generated by using the road information received from the server 10 and/or generated by the step of 406, and the positioning information of the car 70 calculated (at the step 407).

Finally, the apparatus 20, placed on the car 70, supports to drive the car 70 and/or automatically drives the car 70 by using the road information which includes virtual digital driving orbit (lattice of coordinate) 60 from the saver 10 and/or calculated by the road parameters, and GPS (Global Positioning System) information from GPS satellite 50 for calculating the position of the car 70 (at the step 408 ).

At the steps of 402 and 406, the communication with the apparatus 20, 20A and the computer network 40 is executed by using communication tool 30 such as a mobile phone. And the computer network 40 is constructed by an internet and/or an intranet.

At the steps of 407, the base position information is the GPS information, the magnetic nail information, and/or the beacon information.

Next, a process at the step of 407 will be explained in FIGS. 9 to 17.

FIGS. 9 to 12B are the diagrams showing the examples of the road parameters loaded from the data base 13 of the road geometry.

FIG. 13 is a diagram showing an example of the processes of generating the road information with the virtual digital driving orbit 60.

Figure 14:
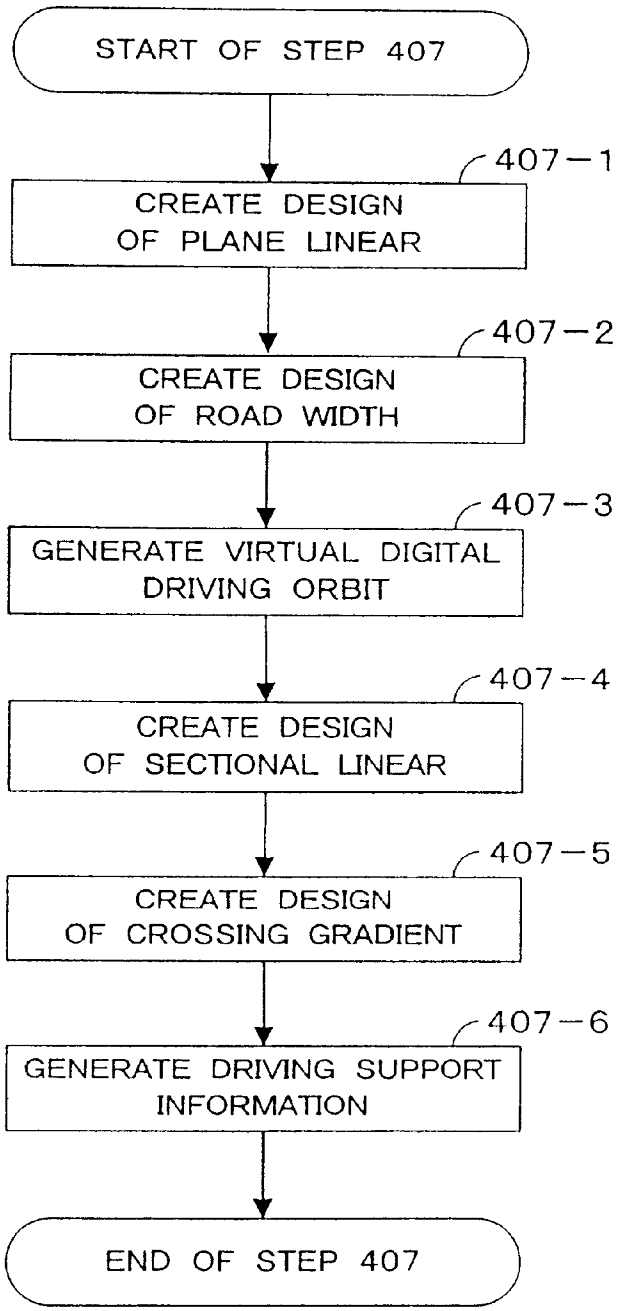
FIG. 14 is a flowchart showing an example of the processes of generating the road information with the virtual digital driving orbit.

FIG. 14 is a flowchart showing an example of the processes of generating the road information with the virtual digital driving orbit 60.

Figure 15:
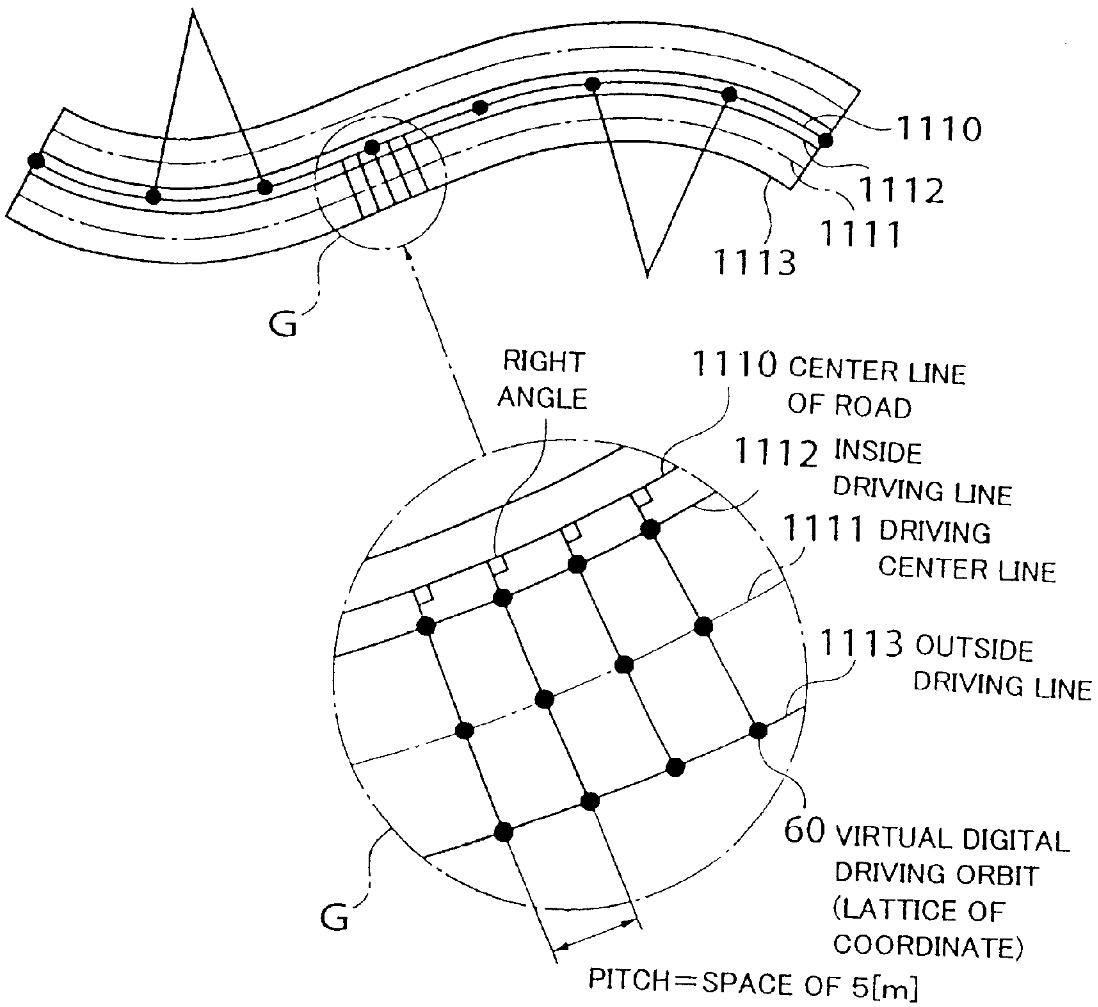
FIG. 15 is a diagram showing an example of the virtual digital driving orbit (lattice of coordinate)

FIG. 15 is a diagram showing an example of the virtual digital driving orbit (lattice of coordinate) 60.

Figure 16A:
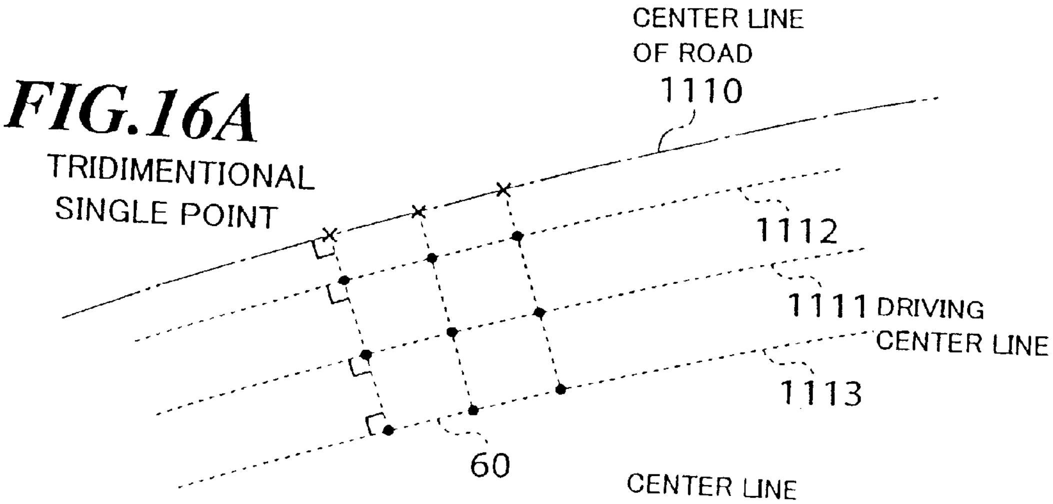
FIG. 16A is a diagram showing an example of the way for using the virtual digital driving orbit (lattice of coordinate)
Figure 16B:
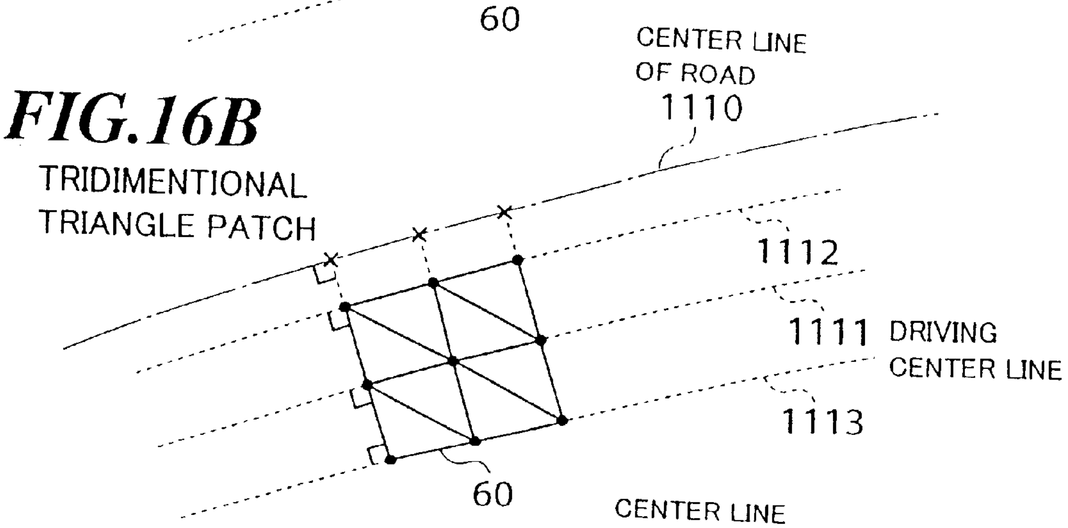
FIG. 16B is a diagram showing an example of the way for using the virtual digital driving orbit (lattice of coordinate)
Figure 16C:
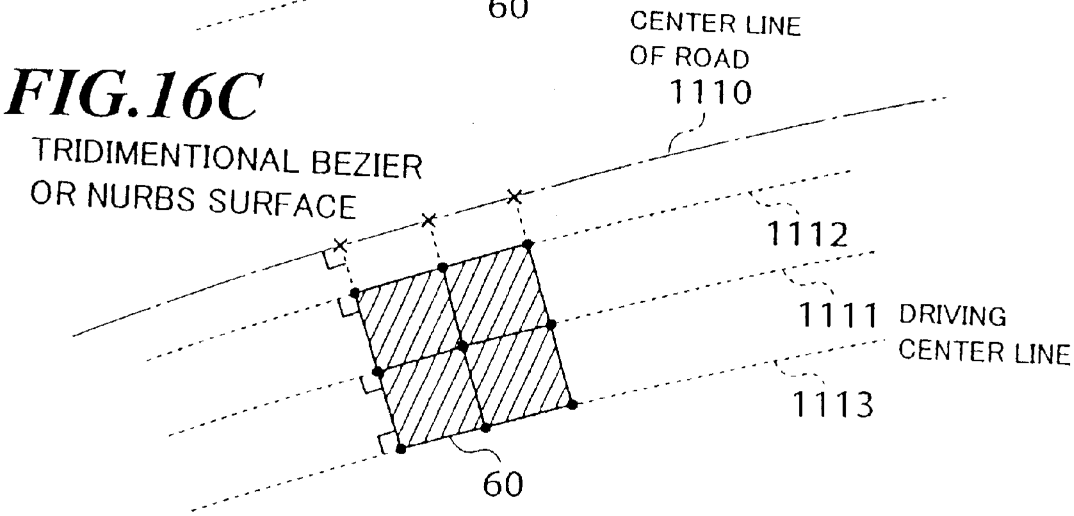
FIG. 16C is a diagram showing an example of the way for using the virtual digital driving orbit (lattice of coordinate)

FIGS. 16A to 16C are the diagram showing the examples of the way for using the virtual digital driving orbit (lattice of coordinate) 60.

Figure 17:
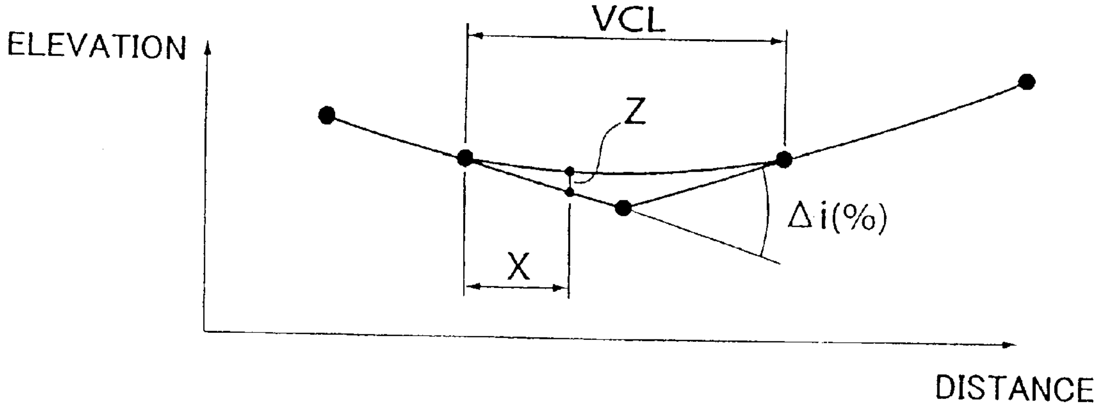
FIG. 17 is a diagram showing an example of the way for calculating an elevation of the road on the design of the crossing gradient.

FIG. 17 is a diagram showing an example of the way for calculating an elevation of the road on the design of the crossing gradient.

Figures 13A, 13B, 13C, 13D:
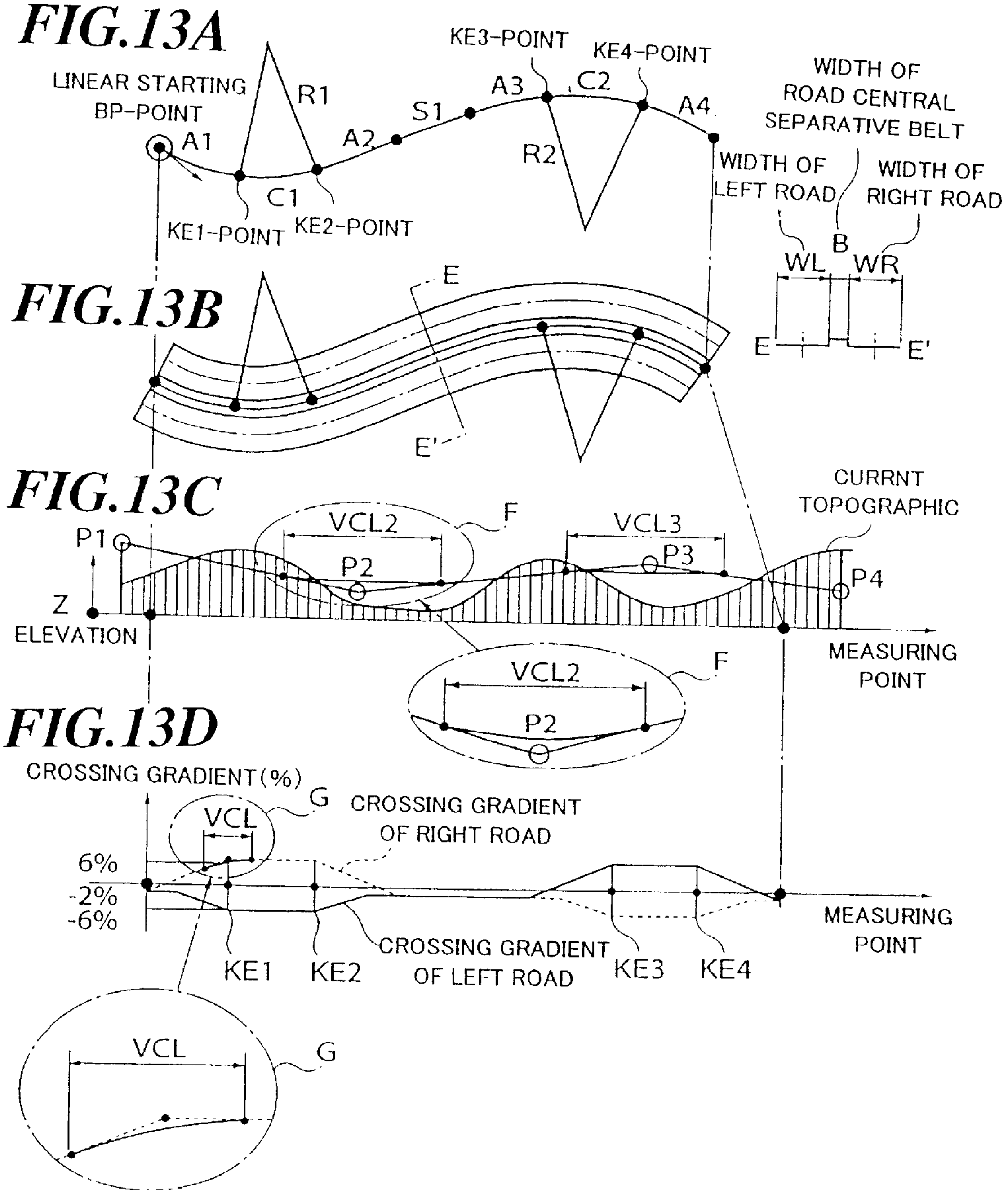
FIG. 13 is a diagram showing an example of the processes of generating the road information with the virtual digital driving orbit.

In the apparatus 20, 20A, the unit 23 creates the design of the plane linear (at the step 407-1, FIGS. 9 and 13A).

Next, the unit 23 creates the design of the road width (ate the step 407-2, FIGS. 10 and 13B)

And then, the unit 23 creates the virtual digital driving orbit 60 (at the step 407-3, FIGS. 15 to 16C).

And the unit 23 create the design of the sectional linear (at the step 407-4, FIGS. 11, 13C and 17).

Next, the unit 23 create the design of the crossing gradient (at the step 407-5, FIGS. 12A, 12B, 13D and 17).

And then, the unit 23 generates the driving support information (at the step 407-6).

At the step 407-3, the road information includes the virtual digital driving orbit 60 for indicating the driving orbit of the car 70. And the unit 23 generates the virtual digital driving orbit 60 by line segment, circular arcs and/or clothoid curve, and generates a clothoid curve from a clothoid origin without executing exceptional processing near the clothoid origin in case of generating a curvature transition curve of the virtual digital driving orbit 60 using the clothoid curve, by calculating coordinates of the clothoid curve using the following recurrence equation (1), of which parameters are only the arc length "λ" from said clothoid origin, expressed as $$x = \sum_{n=0}^{\infty}(-1)^n\frac{\lambda^{4n+1}}{(4n+1)\cdot 2^{2n}\cdot(2n)!} \qquad \text{(Equation 1)}$$

$$y = \sum_{n=0}^{\infty}(-1)^n\frac{\lambda^{4n+3}}{(4n+3)\cdot 2^{2n+1}\cdot(2n+1)!}$$

where "λ" is the unit clothoid arc length, "x" and "y" is a coordinate of the arc length "λ" from a clothoid origin of the unit clothoid curve, and "n" is order.

Wherein, the unit 23 generates the clothoid curve using the following relation equation (2) of a "n" term (Tx(n), Ty(n)), which is deduced by expanding "x" and "y" of said recurrence equation (1) in a series, expressed as $$Tx(n+1) = -\frac{(4n+1)\cdot\lambda^4}{4\cdot(4n+5)\cdot(2n+2)\cdot(2n+1)}Tx(n) \qquad \text{(Equation 2)}$$

$$(n = 0, 1, 2, \Lambda)$$

$$Tx(0) = \lambda$$

$$Ty(n+1) = -\frac{(4n+3)\cdot\lambda^4}{4\cdot(4n+7)\cdot(2n+3)\cdot(2n+2)}Ty(n)$$

$$(n = 0, 1, 2, \Lambda)$$

$$Ty(0) = \frac{\lambda^3}{3\cdot 2}$$

FIGS. 18 to 25 are the diagrams showing the examples of using the driving support information at the step of 408 in FIG. 8.

Figure 22:
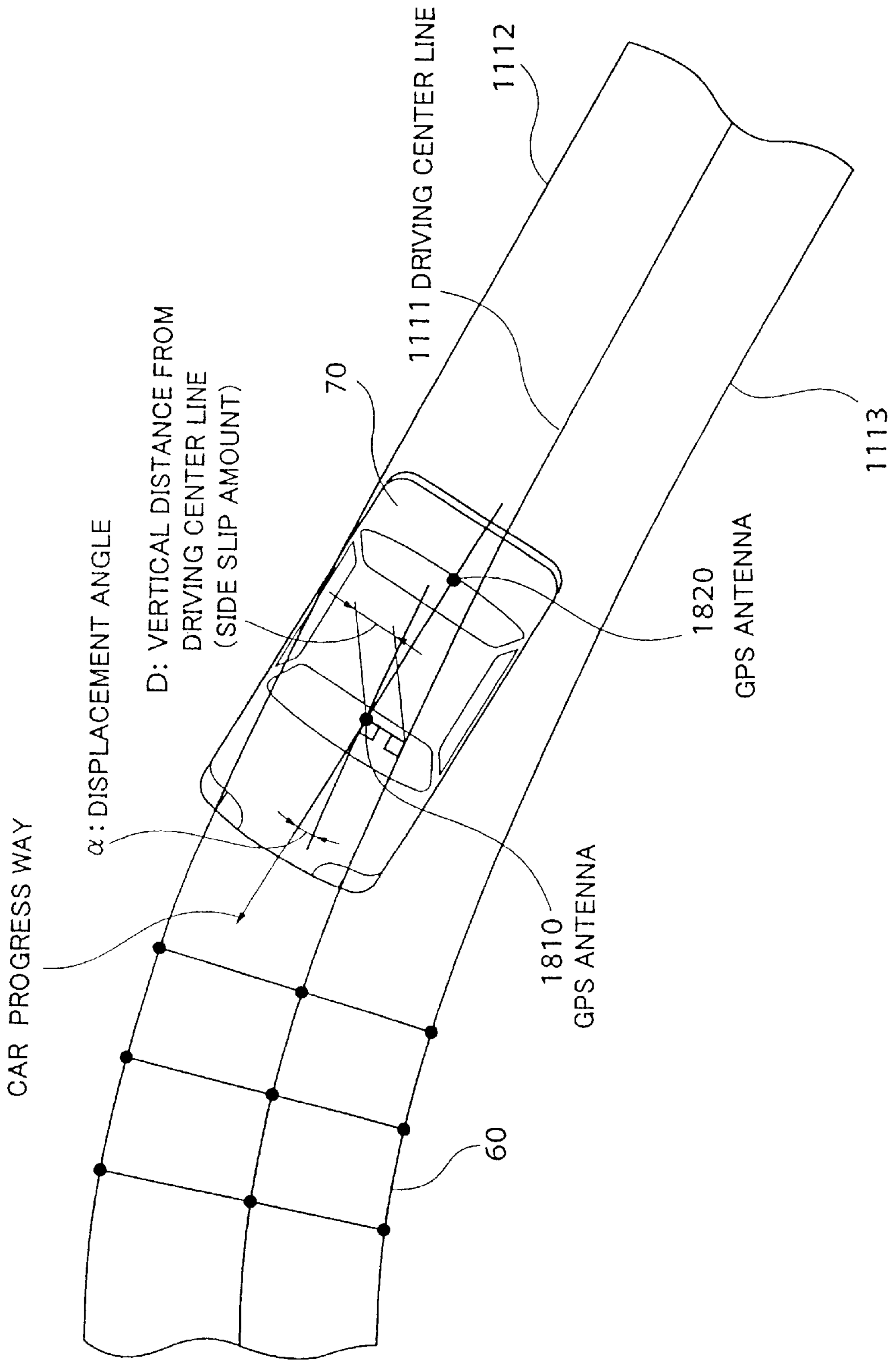
FIG. 22 is a diagram showing an example of using the driving support information at the step of 408 in FIG. 8.
Figure 23:
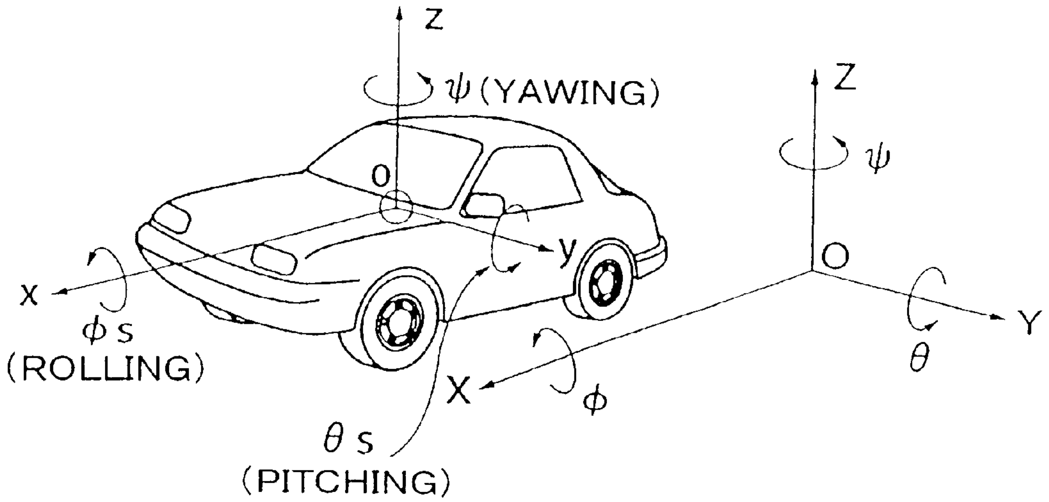
FIG. 23 is a diagram showing an example of using the driving support information at the step of 408 in FIG. 8.
Figure 24:
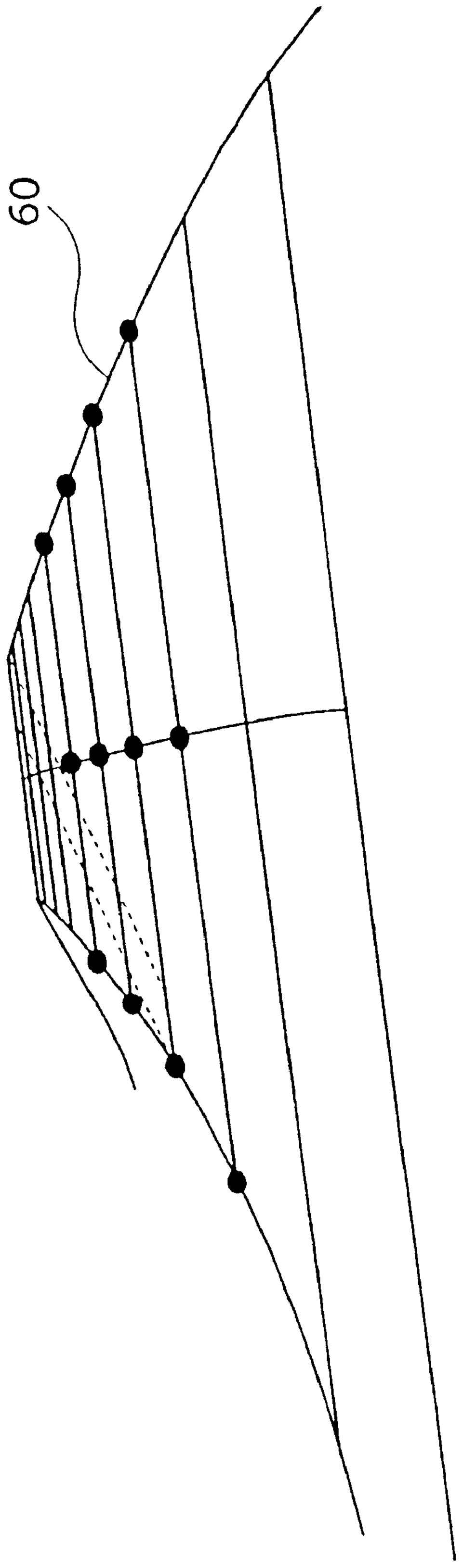
FIG. 24 is a diagram showing an example of using the driving support information at the step of 408 in FIG. 8.
Figure 25:
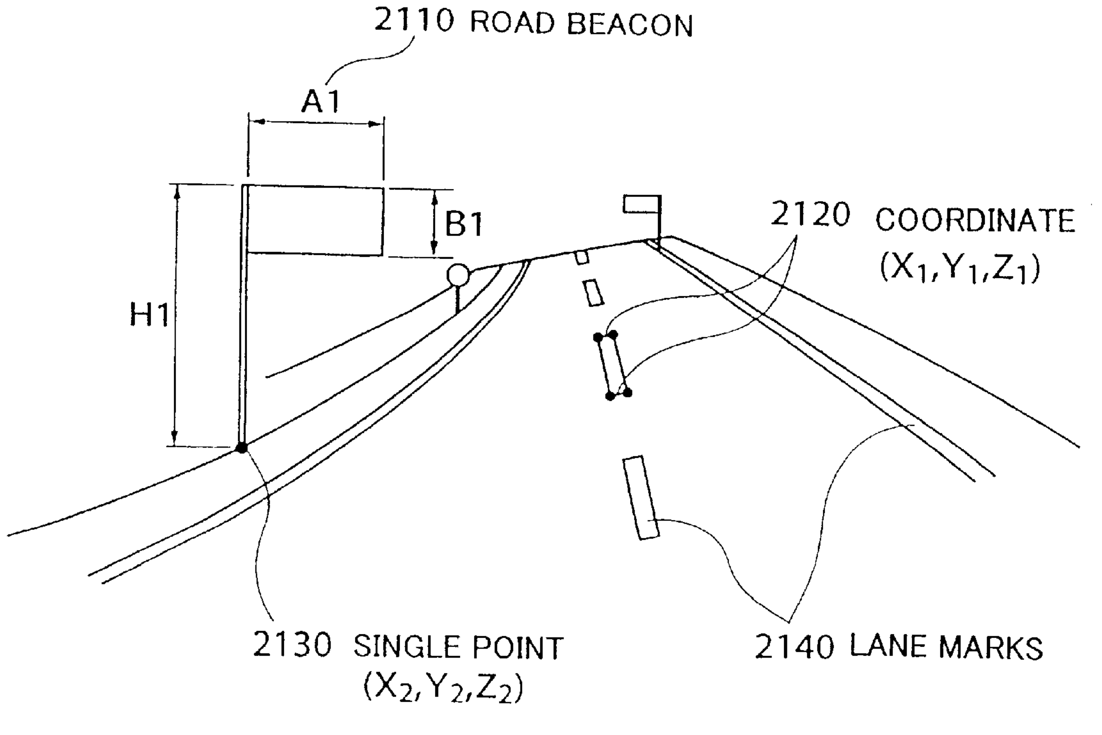
FIG. 25 is a diagram showing an example of using the driving support information at the step of 408 in FIG. 8.

The unit 23 generates the driving support information. For example, the instrumentation information is generated by measuring the car condition, and the driving support information is generated by using the road information received from the server 10 and/or generated by the step of 406 (in FIG.8), the positioning information of the car 70 calculated, and the instrumentation information which includes the accumulating distance information, the speed information, the rolling angle information, and the way angle information by a handle of said car (FIGS. 22 and 23).

Figure 18:
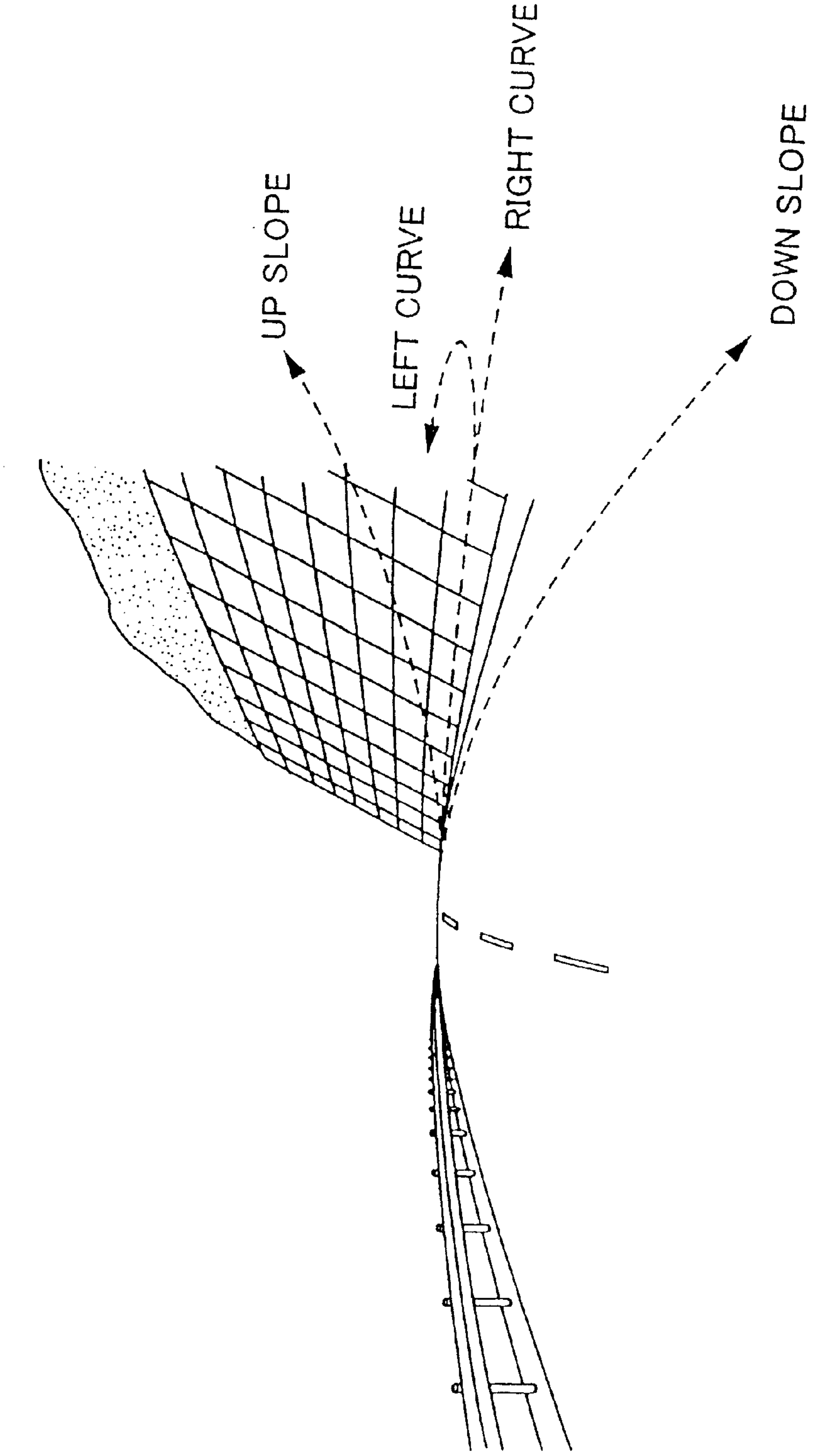
FIG. 18 is a diagram showing an example of using the driving support information at the step of 408 in FIG. 8.
Figure 19:
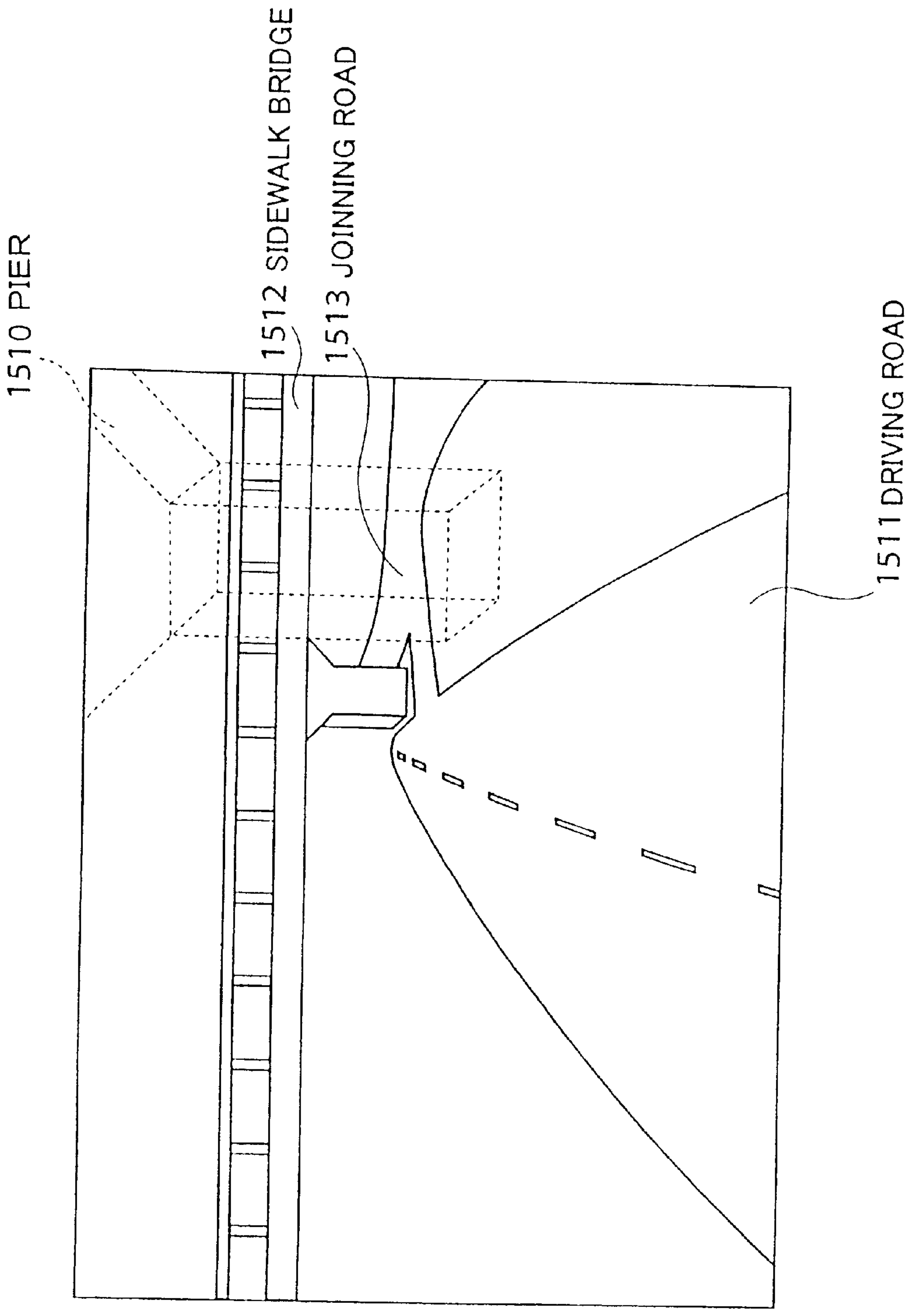
FIG. 19 is a diagram showing an example of using the driving support information at the step of 408 in FIG. 8.
Figure 20:
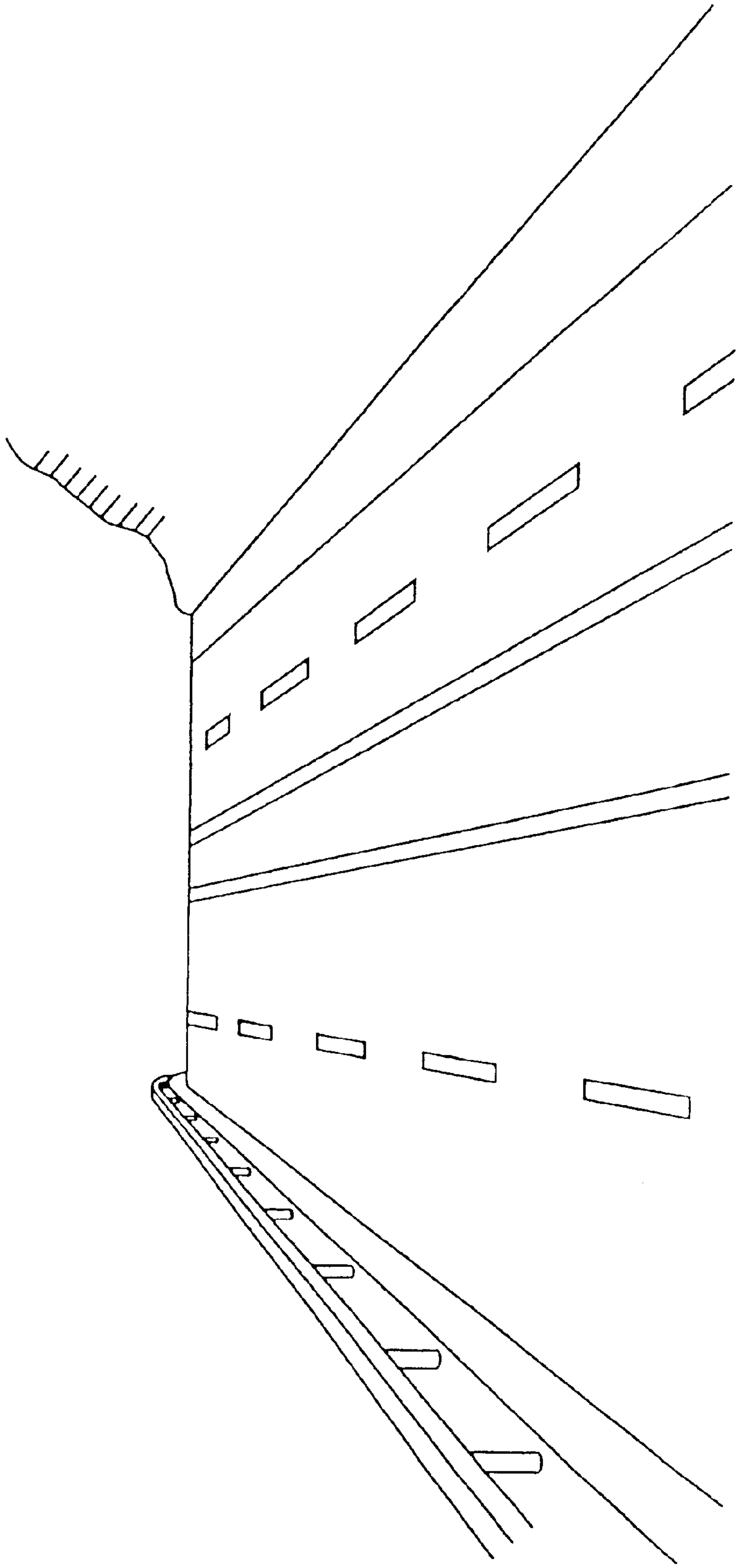
FIG. 20 is a diagram showing an example of using the driving support information at the step of 408 in FIG. 8.

In another way, the unit 23 generates the driving support information based on the road information received from the server 10 and/or generated by the step of 406 (in FIG.8), the positioning information of the car 70 calculated, and beforehand stored map information (FIGS. 18 to 20).

Figure 21:
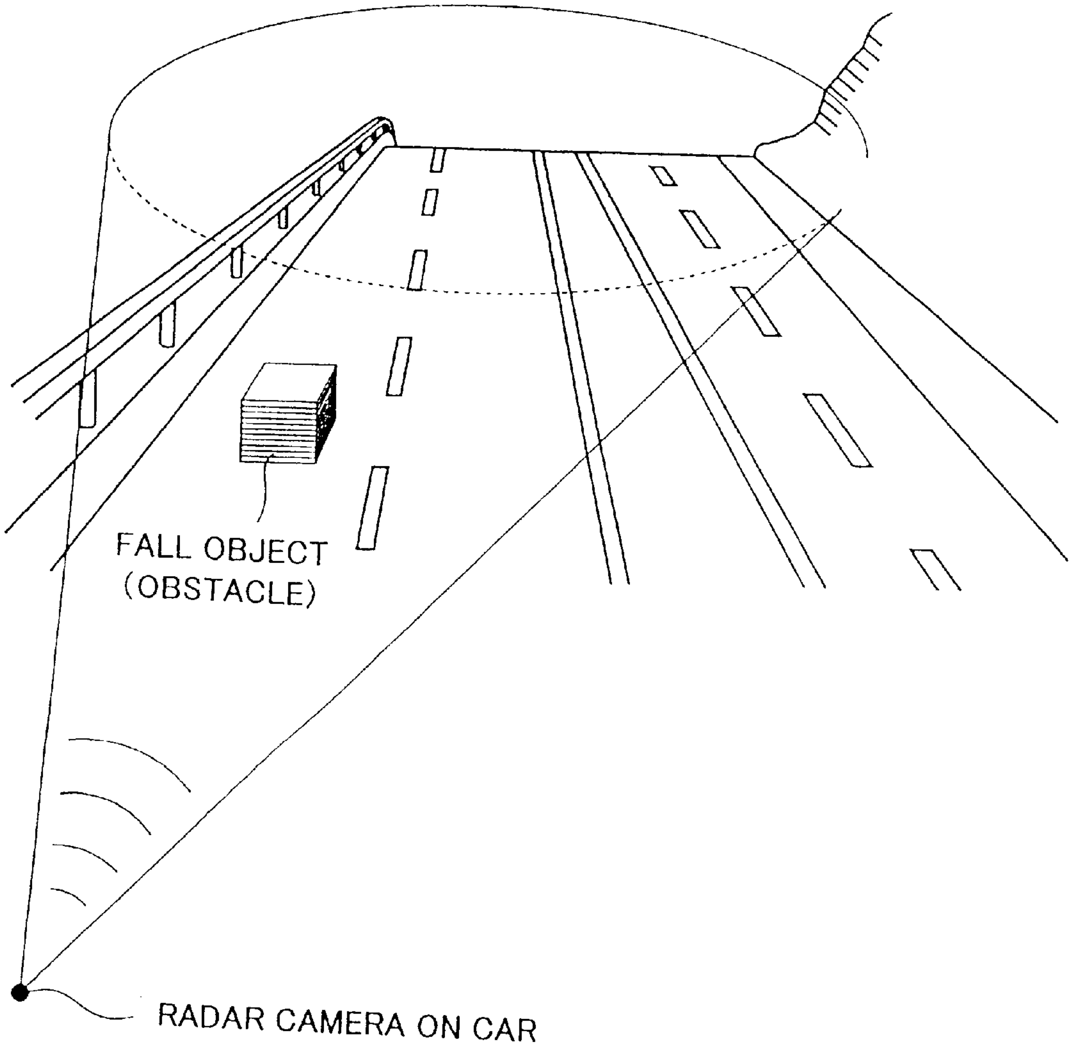
FIG. 21 is a diagram showing an example of using the driving support information at the step of 408 in FIG. 8.

And the unit 23 also generates the driving support information by using the image information from the radar camera and/or laser scan unit (FIG. 21).

The image of FIGS. 18 to 25 are able to be displayed on the output unit 24*b* by using the driving support information.

Figure 26:
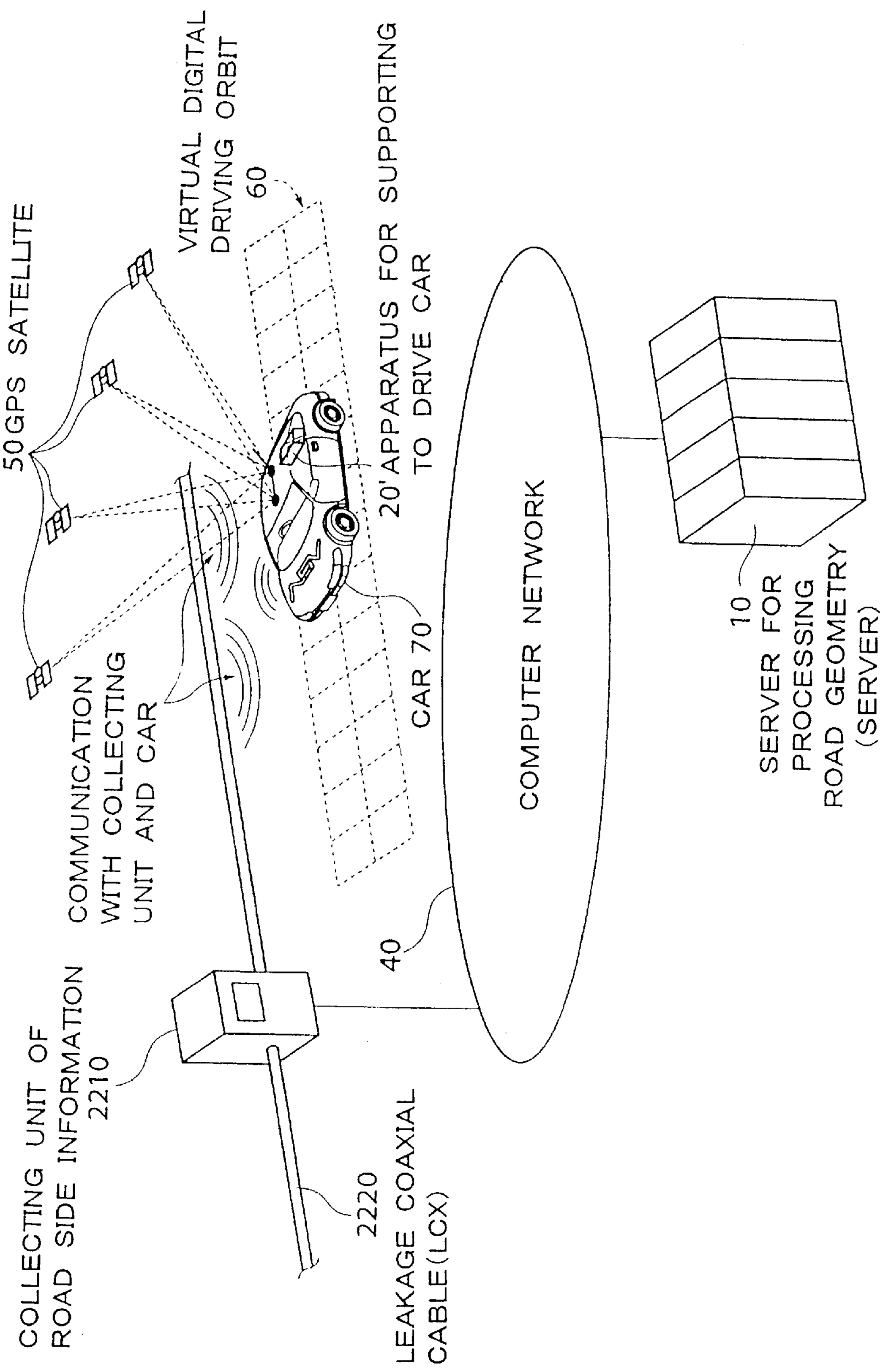
FIG. 26 is a diagram showing an example of the system for supporting to drive cars according to the present invention.

FIG. 26 is a diagram showing an example of the system for supporting to drive cars according to the present invention.

In FIG. 26, a system for supporting to drive cars has a server 10 for processing road geometry, an apparatus 20' for supporting to drive a car 70, a collecting unit 2210 road side information with a LCX (Leakage Coaxial Cable) 2220 for communicating with the apparatus 20', and a computer network 40 for communicating with the server 10 and the collecting unit 2210 with the LCX 2220, wherein the saver 10 provides road parameters and/or road information for the apparatus 20', and the apparatus 20', placed on the car 70, supports to drive the car 70 and/or automatically drives the car 70 by using the road information which includes virtual digital driving orbit (lattice of coordinate) 60 from the saver 10 and/or calculated by the road parameters, and GPS (Global Positioning System) information from GPS satellite 50 for calculating the position of the car 70.

The computer network 40 is constructed by an internet or an intranet.

Figure 27:
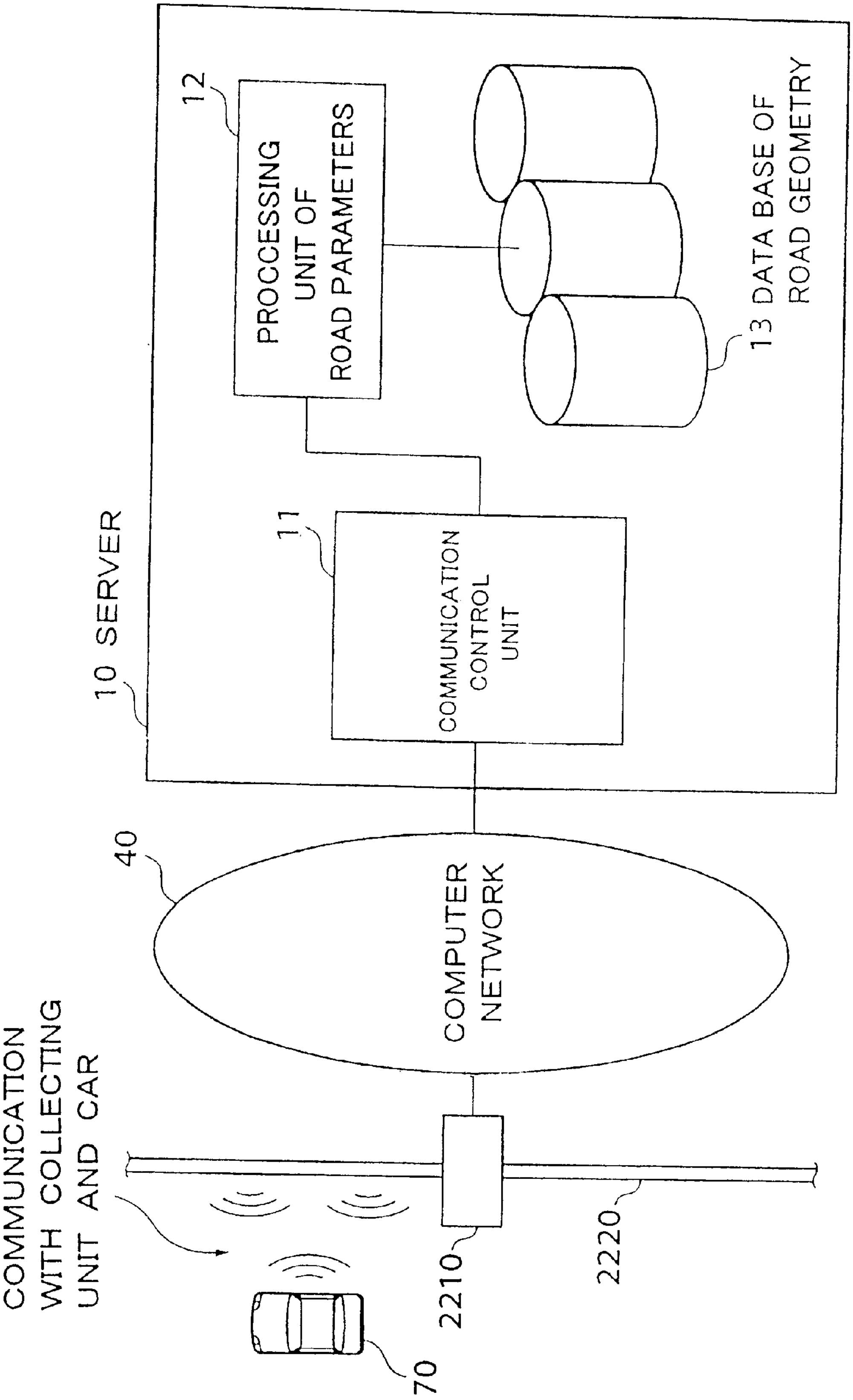
FIG. 27 is a diagram showing an example of the server for processing road geometry in the system for supporting to drive cars according to the present invention.

FIG. 27 is a diagram showing an example of the server for processing road geometry in the system for supporting to drive cars according to the present invention. In FIG. 27, the server 10 for processing the road geometry includes a communication control unit 11 for controlling communication with the computer network 40, a data base 13 of the road geometry for storing the road parameters and/or the road information, and a processing unit 12 of the road parameters for loading the road parameters and the road information stored in the data base 13 in dependence upon a request received from the apparatus 20' for supporting to drive the car 70 via the communication control unit 11.

Figure 28:
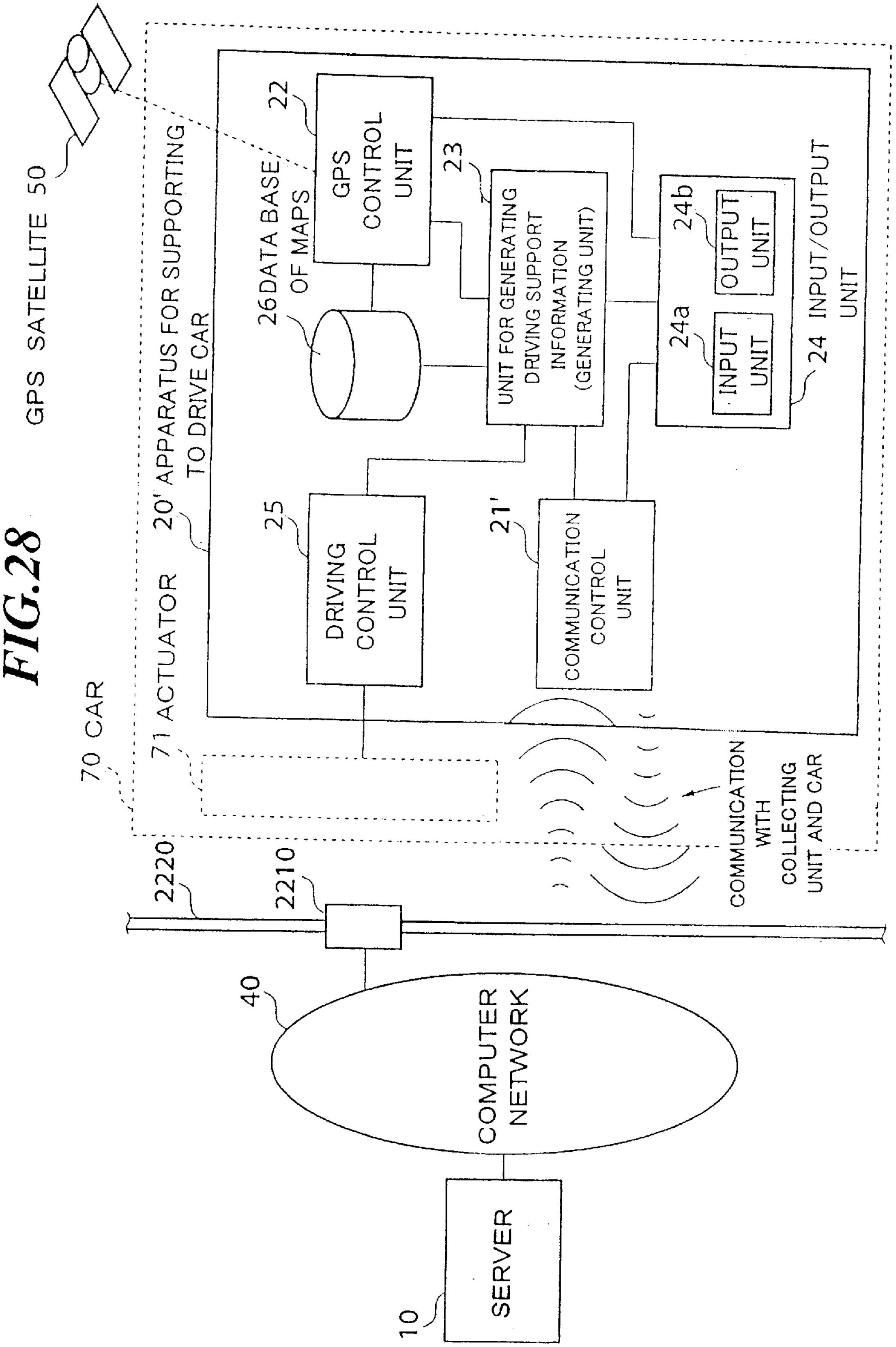
FIG. 28 is a diagram showing an example of the apparatus for supporting to drive a car in the system for supporting to drive cars according to the present invention.

FIG. 28 is a diagram showing an example of the apparatus for supporting to drive a car in the system for supporting to drive cars according to the present invention. In FIG. 28, the apparatus 20' for supporting to drive the car 70 includes a communication control unit 21' for controlling communication with the LCX 2220 of the collecting unit 2210, a GPS control unit (positioning information control unit) 22 for calculating position information of the car 70 by using base position information (GPS information) from the GPS satellite 50, a data base 26 of maps for storing a part or all of the road information and/or map information, an unit 23 for generating driving support information by using the road parameters, the road information from the server 10 for processing the road geometry, the positioning information of the car 70 from the GPS control unit (the positioning information control unit), and/or the map information of the data base 26, an input/output unit 24 having an input unit 24*a* for inputting the request and an output unit 24*b* for displaying the road information and/or the driving support information, and a driving control unit 25 for controlling to drive the car 70 by controlling an actuator 71 by using the driving support information generated by the unit 23 for generating the driving support information.

Figure 29:
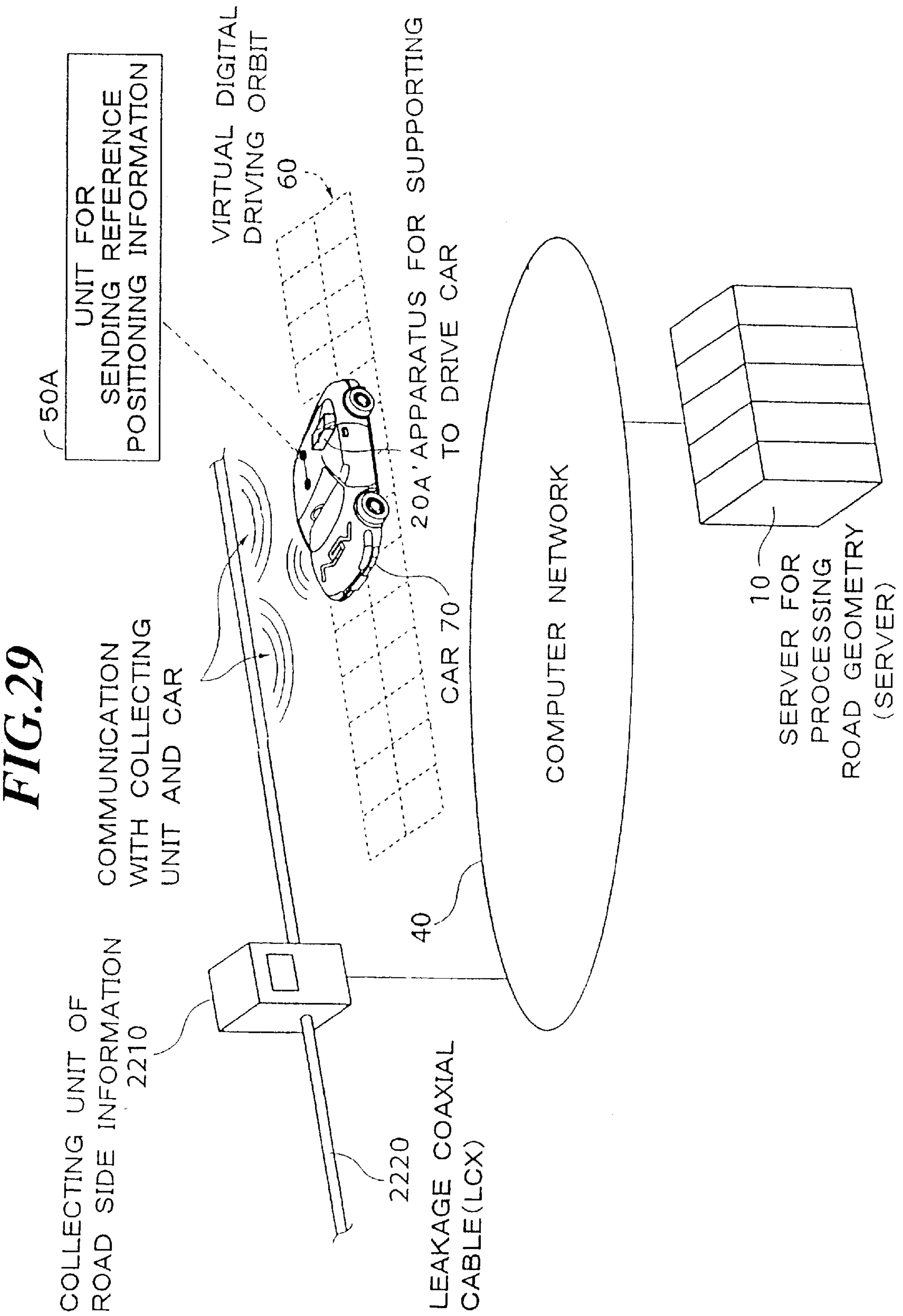
FIG. 29 is a diagram showing an example of the system for supporting to drive cars according to the present invention.

FIG. 29 is a diagram showing an example of the system for supporting to drive cars according to the present invention. In FIG. 29, the system for supporting to drive cars has a server 10 for processing road geometry, an apparatus 20A' for supporting to drive a car 70, a collecting unit 2210 road side information with a LCX (Leakage Coaxial Cable) 2220 for communicating with the apparatus 20A', and a computer network 40 for communicating with the server 10 and the collecting unit 2210 with the LCX 2220, wherein the saver 10 provides road parameters and/or road information for the apparatus 20A', and the apparatus 20A', placed on the car 70, supports to drive the car 70 and/or automatically drives the car 70 by using the road information which includes virtual digital driving orbit (lattice of coordinate) 60 from the saver 10 and/or calculated by the road parameters, and base position information, from an unit 50A (such as the GPS, magnetic nail, and beacon) for sending reference positioning information, for calculating the position of the car 70.

In this case, the base position information is obtained from the GPS, the magnetic nail, and/or the beacon.

In the system for supporting to drive cars, the communication with the apparatus 20A, 20A' and the computer network 40 is executed by using the collecting unit 2210 with the LCX 2220. And the computer network 40 is constructed by an internet or an intranet.

Figure 30:
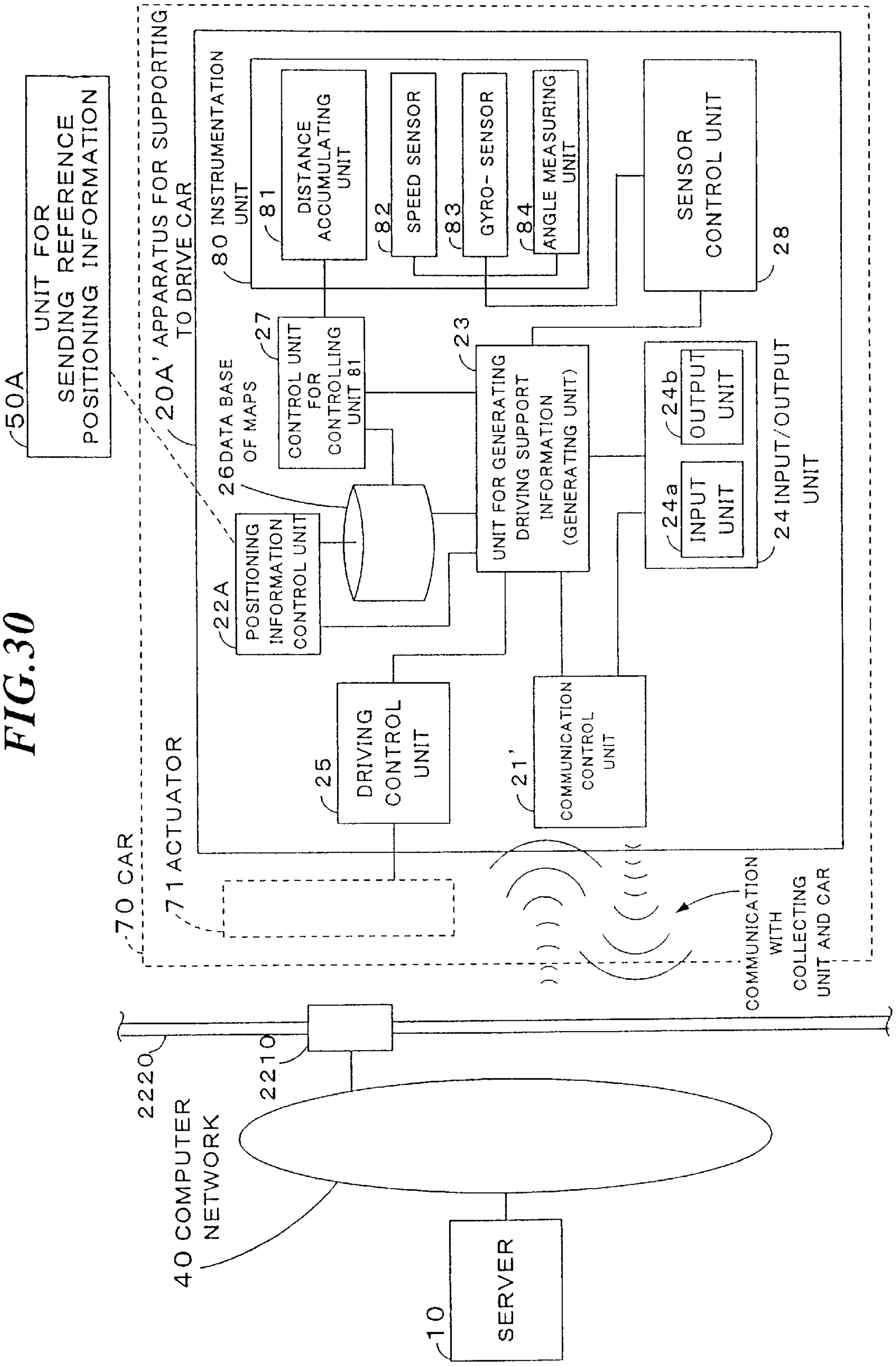
FIG. 30 is a diagram showing an example of the apparatus for supporting to drive a car in the system for supporting to drive cars according to the present invention.

FIG. 30 is a diagram showing an example of the apparatus for supporting to drive a car in the system for supporting to drive cars according to the present invention. In FIG. 30, the apparatus 20A' for supporting to drive the car 70 includes a communication control unit 21' for controlling communication with the computer network 40 via the collecting unit 2210 with the LCX 2220, a positioning information control unit 22A for calculating position information of the car 70 by using the base position information from the unit 50A, a data base 26 of maps for storing a part or all of the road information and/or map information, an instrumentation unit 80 for calculating an instrumentation value by detecting a car condition, instrumentation information control units (comprising a control unit 27 for controlling a distance accumulating unit 81, and a sensor control unit 28) for generating instrumentation information based on the instrumentation value received from the instrumentation unit 80, an unit 23 for generating driving support information based on the road information generated based on the road parameters and/or received from the server 10 for processing the road geometry, the positioning information received from the positioning information control unit 22A, the instrumentation information received from the instrumentation information control units 27 and 28, and/or the map information of the data base 26, an input/output unit 24 having an input unit 24*a* for inputting the request and an output unit 24*b* for displaying the road information and/or the driving support information, and a driving control unit 25 for controlling to drive the car 70 by controlling an actuator 71 by using the driving support information generated by the unit 23 for generating the driving support information.

In the system for supporting to drive cars, the instrumentation unit 80 has a distance accumulating unit 81 for calculating an instrumentation value by accumulating driving distance of the car 70, a speed sensor 82 for calculating an instrumentation value by measuring speed of the car 70, a gyro-sensor 83 for calculating an instrumentation value by measuring gradient of the car 70, and an angle measuring unit 84 for calculating an instrumentation value by measuring an angle of car progress way.

The control unit 27 for controlling the distance accumulating unit 81 generates accumulating distance information based on the instrumentation value from the distance accumulating unit 81. The sensor unit 28 generates the speed information based on the instrumentation value from the speed sensor 82, the rolling angle information based on the instrumentation value from the gyro-sensor 83, and the way angle information based on the instrumentation value from the angle measuring unit 84.

In the system for supporting to drive cars, the road information includes the virtual digital driving orbit 60 for indicating driving orbit of the car 70.

And the unit 23 for generating the driving support information generates the virtual digital driving orbit 60 by line segment, circular arcs and/or clothoid curve, and generates a clothoid curve from a clothoid origin without executing exceptional processing near said clothoid origin in case of generating a curvature transition curve of the virtual digital driving orbit 60 using the clothoid curve, by calculating coordinates of the clothoid curve using the following recurrence equation (1), of which parameters are only the arc length "λ" from the clothoid origin, expressed as (Equation 1)

$$x = \sum_{n=0}^{\infty} (-1)^n \frac{\lambda^{4n+1}}{(4n+1)\cdot 2^{2n}\cdot(2n)!}$$

$$y = \sum_{n=0}^{\infty} (-1)^n \frac{\lambda^{4n+3}}{(4n+3)\cdot 2^{2n+1}\cdot(2n+1)!}$$

where "λ" is the unit clothoid arc length, "x" and "y" is a coordinate of the arc length "λ" from a clothoid origin of the unit clothoid curve, and "n" is order.

And the unit 23 for generating the driving support information generates the clothoid curve using the following relation equation (2) of a "n" term (Tx(n), Ty(n)), which is deduced by expanding "x" and "y" of the recurrence equation (1) in a series, expressed as (Equation 2)

$$Tx(n+1) = -\frac{(4n+1)\cdot\lambda^4}{4\cdot(4n+5)\cdot(2n+2)\cdot(2n+1)}Tx(n)$$

$$(n = 0, 1, 2, \Lambda)$$

$$Tx(0) = \lambda$$

$$Ty(n+1) = -\frac{(4n+3)\cdot\lambda^4}{4\cdot(4n+7)\cdot(2n+3)\cdot(2n+2)}Ty(n)$$

$$(n = 0, 1, 2, \Lambda)$$

$$Ty(0) = \frac{\lambda^3}{3\cdot 2}$$

In the system for supporting to drive cars indicated FIGS. 5, 7, 28 and 30, the unit 23 for generating driving support information is able to generate the driving support information by using the image information from the radar camera and/or a laser scan unit.

It is easy to make the program products for supporting to drive cars according to the present invention, which is executed by computer system.

The invention to provide the system, the method and the program products for supporting to drive cars automatically and safety can drive the cars without the high costs and with high performance.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A system for supporting driving of cars, said system comprising:

a server for processing road geometry;

an apparatus for supporting driving of a car; and a computer network for communicating with said server and said apparatus, wherein said server for processing road geometry includes communication control means for controlling communication with said computer network, storing means of the road geometry for storing at least one of road parameters and road information, and processing means of the road parameters for loading the road parameters and the road information stored in said storing means in dependence upon a request received from said apparatus for supporting driving of the car via said communication control means, and said apparatus for supporting driving of the car includes communication control means for controlling communication with said computer network, positioning information control means for calculating a position information of the car by using a base position information, means for generating driving support information by using at least one of the road parameters and the road information from said server for processing the road geometry and the position information of the car from said positioning information control means, wherein the road information includes a virtual digital driving orbit for indicating a driving orbit of the car, and said means for generating driving support information generates the virtual digital driving orbit by at least one of a line segment, circular arcs and a clothoid curve, and generates a clothoid curve from a clothoid origin without executing exceptional processing near the clothoid origin in a case of generating a curvature transition curve of the virtual digital driving orbit using the clothoid curve, by calculating coordinates of the clothoid curve using the following recurrence equation (1), of which parameters are only an arc length "λ" from the clothoid origin, expressed as (Equation 1)

$$x = \sum_{n=0}^{\infty} (-1)^n \frac{\lambda^{4n+1}}{(4n+1)\cdot 2^{2n}\cdot(2n)!}$$

$$y = \sum_{n=0}^{\infty} (-1)^n \frac{\lambda^{4n+3}}{(4n+3)\cdot 2^{2n+1}\cdot(2n+1)!}$$

where "λ" is a unit clothoid arc length, "x" and "y" is a coordinate of the arc length "λ" from the clothoid origin of the unit clothoid curve, and "n" is an order.

2. The system for supporting driving of cars of claim 1, wherein said means for generating driving support information generates the road information based on the road parameters.

3. The system for supporting driving of cars of claim 1, wherein said apparatus for supporting driving of the car further comprises:

instrumentation means for calculating an instrumentation value by detecting a car condition; and instrumentation information control means for generating instrumentation information based on the instrumentation value received from said instrumentation means, wherein said means for generating driving support information generates the driving support information based on the road information generated based on at least one of the road parameters and the road information received from said server for processing road geometry, the position information received from said positioning information control means, and the instrumentation information received from said instrumentation information control means.

4. The system for supporting driving of cars of claim 3, wherein said instrumentation means comprises:

distance accumulating means for calculating an instrumentation value by accumulating a driving distance of the car;

speed sensor means for calculating an instrumentation value by measuring a speed of the car;

gyro-sensor for calculating an instrumentation value by measuring a gradient of the car; and angle measuring means for calculating an instrumentation value by measuring an angle of a way of car progress, wherein said instrumentation information control means generates accumulating distance information based on the instrumentation value from said distance accumulating means, generates speed information based on the instrumentation value from said speed sensor means, generates rolling angle information based on the instrumentation value from said gyro-sensor, and generates way angle information based on the instrumentation value from said angle measuring means.

5. The system for supporting driving of cars of claim 1, further comprises:

input means for inputting the request; and output means displaying at least one of the road information and the driving support information.

6. The system for supporting driving of cars of claim 1, wherein said apparatus for supporting driving of the car further comprises map storing means for storing a part or all of at least one of the road information and map information, wherein said means for generating driving support information generates the driving support information based on the road information, the position information, and the map information.

7. The system for supporting driving of cars of claim 1, further comprising a communication unit for executing communication between said apparatus for supporting driving of the car and said computer network, wherein said communication unit comprises at least one of a mobile phone and a LCX (Leakage Coaxial Cable) placed on a road.

8. The system for supporting driving of cars of claim 1, wherein said computer network is an internet or an intranet.

9. The system for supporting driving of cars of claim 1, wherein said means for generating driving support information generates the driving support information by using image information from at least one of a radar and a laser scan unit.

10. The system for supporting driving of cars of claim 1, wherein said apparatus for supporting driving of the car further comprises driving control means for controlling driving of the car by using the driving support information generated by said means for generating driving support information.

11. The system for supporting driving of cars of claim 1, wherein said means for generating driving support information generates the clothoid curve using the following relation equation (2) of a "n" term (Tx(n), Ty(n)), which is deduced by expanding "x" and "y" of the recurrence equation (1) in a series, expressed as $$Tx(n+1) = -\frac{(4n+1)\cdot\lambda^4}{4\cdot(4n+5)\cdot(2n+2)\cdot(2n+1)}Tx(n) \quad \text{(Equation 2)}$$

$$(n = 0, 1, 2, \Lambda)$$

$$Tx(0) = \lambda$$

$$Ty(n+1) = -\frac{(4n+3)\cdot\lambda^4}{4\cdot(4n+7)\cdot(2n+3)\cdot(2n+2)}Ty(n)$$

$$(n = 0, 1, 2, \Lambda)$$

$$Ty(0) = \frac{\lambda^3}{3\cdot 2}.$$

12. The system for supporting driving of cars of claim 1, wherein the base position information is from at least one of a GPS, a magnetic nail, and a beacon.

13. A method for supporting driving of cars, which executes driving support processes by using a server for processing road geometry, an apparatus for supporting driving of a car, and a computer network for communicating with the server for processing road geometry and the apparatus for supporting driving of the car, said method comprising:

in the apparatus for supporting driving of the car, sending request information inputted for supporting driving of the car to the server for processing road geometry via the computer network;

in the server for processing road geometry, loading at least one of road parameters and beforehand stored road information in dependence upon the request information received from the apparatus for supporting driving of the car, and sending at least one of the road parameters and the road information to the apparatus for supporting driving of the car via the computer network;

in the apparatus for supporting driving of the car, generating road information by using the road parameters when receiving the road parameters from the server for processing road geometry;

in the apparatus for supporting driving of the car, calculating position information of the car by using base position information;

in the apparatus for supporting driving of the car, generating driving support information by using the road information at least one of received from the server for processing road geometry and generated by said generating of the road information operation, and the position information of the car calculated by said calculating of the position information operation, wherein the road information includes a virtual digital driving orbit for indicating a driving orbit of the car, and said generating of the driving support information operation comprises generating the virtual digital driving orbit by at least one of a line segment, circular arcs and a clothoid curve, and generates a clothoid curve from a clothoid origin without executing exceptional processing near the clothoid origin in a case of generating a curvature transition curve of the virtual digital driving orbit using the clothoid curve, by calculating coordinates of the clothoid curve using the following recurrence equation (1), of which parameters are only an arc length "λ" from the clothoid origin, expressed as $$x = \sum_{n=0}^{\infty} (-1)^n \frac{\lambda^{4n+1}}{(4n+1)\cdot 2^{2n}\cdot(2n)!} \qquad \text{(Equation 1)}$$

$$y = \sum_{n=0}^{\infty} (-1)^n \frac{\lambda^{4n+3}}{(4n+3)\cdot 2^{2n+1}\cdot(2n+1)!}$$

where "λ" is a unit clothoid arc length, "x" and "y" is a coordinate of the arc length "λ" from the clothoid origin of the unit clothoid curve, and "n" is an order.

14. A method for supporting driving of cars of claim 13, wherein said generating of the driving support information operation, in the apparatus for supporting driving of the car, comprises generating instrumentation information by measuring car condition, and generating the driving support information by using the road information at least one of received from the server for processing road geometry and generated by said generating of the road information operation, the position information of the car calculated by said calculating of the position information operation, and the instrumentation information.

15. A method for supporting driving of cars of claim 14, wherein the instrumentation information includes accumulating distance information, speed information, rolling angle information, and way angle information about handling of the car.

16. A method for supporting driving of cars of claim 13, wherein at said sending of the request information and said loading of at least one of the road parameters and the beforehand stored road information operations, the communication with said apparatus for supporting driving of the car and the computer network is executed by using a communication unit comprising a mobile phone.

17. A method for supporting driving of cars of claim 13, wherein at said sending of the request information and said loading of at least one of the road parameters and the beforehand stored road information operations, the communication with the apparatus for supporting driving of the car and the computer network is executed by a LCX (Leakage Coaxial Cable) placed on a road.

18. A method for supporting driving of cars of claim 13, wherein at said sending of the request information and said loading of at least one of the road parameters and the beforehand stored road information operations, the computer network is an internet or an intranet.

19. A method for supporting to drive cars of claim 13, wherein said generating of the driving support information operation comprises generating the driving support information based on the road information at least one of received from the server for processing road geometry and generated by said generating of the road information operation, the position information of the car calculated by said calculating of the position information operation, and beforehand stored map information.

20. A method for supporting driving of cars of claim 13, wherein said generating of the driving support information operation comprises generating the driving support information by using image information from at least one of a radar and a laser scan unit.

21. A method for supporting driving of cars of claim 13, wherein said generating of the driving support information operation further comprises generating the clothoid curve using the following relation equation (2) of a "n" term (Tx(n), Ty(n)), which is deduced by expanding "x" and "y" of the recurrence equation (1) in a series, expressed as $$Tx(n+1) = -\frac{(4n+1)\cdot\lambda^4}{4\cdot(4n+5)\cdot(2n+2)\cdot(2n+1)}Tx(n) \qquad \text{(Equation 2)}$$

$$(n = 0, 1, 2, \Lambda)$$

$$Tx(0) = \lambda$$

$$Ty(n+1) = -\frac{(4n+3)\cdot\lambda^4}{4\cdot(4n+7)\cdot(2n+3)\cdot(2n+2)}Ty(n)$$

$$(n = 0, 1, 2, \Lambda)$$

$$Ty(0) = \frac{\lambda^3}{3\cdot 2}.$$

22. A method for supporting driving of cars of claim 13, wherein at said calculating of the position information operation, the base position information is at least one of GPS information, magnetic nail information, and beacon information.

23. A computer program on a computer readable medium for supporting driving of cars which is executed by a computer system, said computer program comprising:

a program product operable to send request information inputted for supporting driving of a car to a server for processing road geometry via a computer network;

a program product operable to load at least one of road parameters and beforehand stored road information in dependence upon the request information received from an apparatus for supporting driving of the car, and send at least one of the road parameters and the road information to the apparatus for supporting driving of the car via the computer network;

a program product operable to generate road information by using the road parameters when receiving the road parameters from the server for processing road geometry;

a program product operable to calculate position information of the car by using base position information;

a program product operable to generate driving support information by using the road information at least one of received from the server for processing road geometry and generated by said program product operable to generate the road information, and the position information of the car calculated by said program product operable to calculate the position information, wherein the road information includes a virtual digital driving orbit for indicating a driving orbit of the car, and said program product operable to generate the driving support information generates the virtual digital driving orbit by at least one of a line segment, circular arcs and a clothoid curve, and generates a clothoid curve from a clothoid origin without executing exceptional processing near the clothoid origin in a case of generating a curvature transition curve of the virtual digital driving orbit using the clothoid curve, by calculating coordinates of the clothoid curve using the following recurrence equation (1), of which parameters are only an arc length "λ" from the clothoid origin, expressed as (Equation 1)

$$x=\sum_{n=0}^{\infty}(-1)^n\frac{\lambda^{4n+1}}{(4n+1)\cdot 2^{2n}\cdot(2n)!}$$

$$y=\sum_{n=0}^{\infty}(-1)^n\frac{\lambda^{4n+3}}{(4n+3)\cdot 2^{2n+1}\cdot(2n+1)!}$$

where "λ" is a unit clothoid arc length, "x" and "y" is a coordinate of the arc length "λ" from the clothoid origin of the unit clothoid curve, and "n" is an order.

24. A computer program for supporting driving of cars of claim 23, wherein said program product operable to generate the driving support information generates instrumentation information by measuring car condition, and generates the driving support information by using the road information at least one of received from the server for processing road geometry and generated by said program product operable to generate the road information, the position information of the car calculated by said program product operable to calculate the position information, and the instrumentation information.

25. A computer program for supporting driving of cars of claim 24, wherein the instrumentation information includes accumulating distance information, speed information, rolling angle information, and way angle information about handling of the car.

26. A computer program for supporting driving of cars of claim 23, wherein at said program product operable to send the request information and said program product operable to load at least one of the road parameters and the beforehand stored road information, the communication with the apparatus for supporting driving of the car and the computer network is executed by using a communication unit comprising a mobile phone.

27. A computer program for supporting driving of cars of claims 23, wherein at said program product operable to send the request information and said program product operable to load at least one of the road parameters and the beforehand stored road information, the communication with the apparatus for supporting driving of the car and the computer network is executed using an LCX (Leakage Coaxial Cable) placed on a road.

28. A computer program for supporting driving of cars of claim 23, wherein at said program product operable to send the request information and said program product operable to load at least one of the road parameters and the beforehand stored road information, the computer network is an internet or an intranet.

29. A computer program for supporting driving of cars of claim 23, wherein said program product operable to generate the driving support information generates the driving support information based on the road information at least one of received from the server for processing road geometry and generated by said program product operable to generate the road information, the position information of the car calculated by said program product operable to calculate the position information, and beforehand stored map information.

30. A computer program for supporting driving of cars of claim 23, wherein said program operable to generate the driving support information generates the driving support information by using image information from at least one of a radar and a laser scan unit.

31. A computer program for supporting driving of cars of claim 23, wherein said program operable to generate the driving support information generates the clothoid curve using the following relation equation (2) of a "n" term (Tx(n), Ty(n)), which is deduced by expanding "x" and "y" of the recurrence equation (1) in a series, expressed as (Equation 2)

$$Tx(n+1)=-\frac{(4n+1)\cdot\lambda^4}{4\cdot(4n+5)\cdot(2n+2)\cdot(2n+1)}Tx(n)$$

$$(n=0,1,2,\Lambda)$$

$$Tx(0)=\lambda$$

$$Ty(n+1)=-\frac{(4n+3)\cdot\lambda^4}{4\cdot(4n+7)\cdot(2n+3)\cdot(2n+2)}Ty(n)$$

$$(n=0,1,2,\Lambda)$$

$$Ty(0)=\frac{\lambda^3}{3\cdot 2}.$$

32. A computer program for supporting driving of cars of claim 23, wherein at said program product operable to calculate the position information, the base position information is at least one of GPS information, magnetic nail information, and beacon information.

* * * * *